United States Patent [19]

Forrest

[11] 3,806,662

[45] Apr. 23, 1974

[54] BUILDING ENTRANCE CONTROL SYSTEM WITH KEY-PAD CONTROL

[75] Inventor: Wilfrid Forrest, Brockville, Ontario, Canada

[73] Assignee: GTE Automatic Electric Laboratories Incorporated, Northlake, Ill.

[22] Filed: July 25, 1972

[21] Appl. No.: 275,016

[52] U.S. Cl. .................................. 179/37, 179/2 A

[51] Int. Cl. ...................... H04m 1/54, H04m 11/00

[58] Field of Search ........................ 179/39, 37, 2 A; 340/365 S

[56] References Cited

UNITED STATES PATENTS

| | | | |
|---|---|---|---|
| 3,538,256 | 11/1970 | Lucas | 340/365 S |
| 3,622,710 | 11/1971 | Tothill | 179/37 |
| 3,557,318 | 1/1971 | Buonsante | 179/39 |
| 3,484,561 | 12/1969 | Matthews | 179/39 |
| 3,708,629 | 1/1973 | First | 179/37 |

*Primary Examiner*—Kathleen H. Claffy
*Assistant Examiner*—Mitchell Saffian
*Attorney, Agent, or Firm*—K. Mullerheim

[57] ABSTRACT

An arrangement for selecting a desired one of a number of operable devices - such as the line relays of a door-intercom system for apartment or the like buildings — by means of a keypad. The operable devices are connected in a circuit matrix and there are digit stores, one for each digit, by means of which one of the first-coordinate and one of the second-coordinate points of access of the matrix are uniquely selected. Each of the digit stores has a set of storage relays whose contacts are connected in relay-tree fashion; the matrix is accessed at its two coordinate ends from these relay trees. The storage equipment is mounted in the form of selection digit stores and auxiliary digit stores — in modular fashion on plug-in type printed circuit cards. This makes for ease in expandability and, in the case of a building entrance control system it permits of different numbering plans. Examples for two numbering plans, one employing coded numbering and the other translation numbering (floor plus apartment numbering) are given.

18 Claims, 18 Drawing Figures

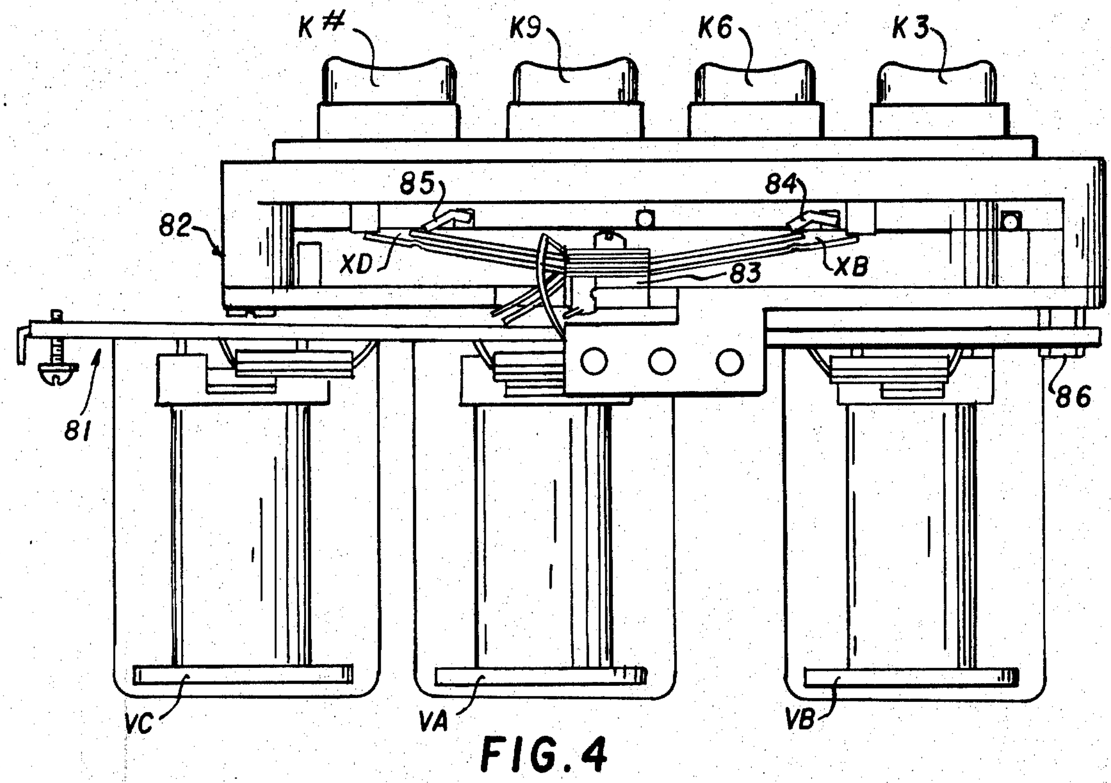
FIG.4
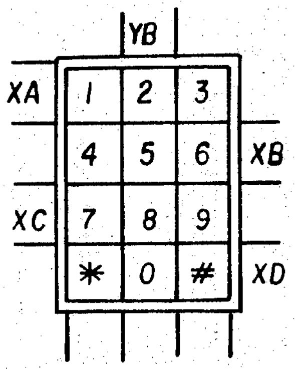
FIG. 5
| DIGIT | KEY PAD CONTACTS | TRANSLATION |
|---|---|---|
| 1 | XA +Y A | A |
| 2 | XA +Y B | B |
| 3 | XA +Y C | C |
| 4 | XB +Y A | D |
| 5 | XB +Y B | AB |
| 6 | XB +Y C | AC |
| 7 | XC +Y A | AD |
| 8 | XC +Y B | BC |
| 9 | XC +Y C | BD |
| 0 | XD+ Y B | CD |
FIG. 6

BUILDING ENTRANCE CONTROL SYSTEM WITH KEY-PAD CONTROL

BACKGROUND OF THE INVENTION

1. Field of the Invention

This invention relates to systems or arrangements for controlling switching, or the like, apparatus by means of a coordinate array of pushbuttons or keys, also referred to herein as a keypad. Although the arrangement according to the invention has been devised primarily with its use in door intercom systems for appartment buildings in mind, the arrangement is also applicable to other environments which require the selective transmission of control signals. Thus the invention may be applied for instance to the transmission of such signals from the turret or attendant's cabinet of PABX (private automatic branch exchange) to the switching equipment of this telephone system.

2. Description of the Prior Art

An example of a door intercom — and entrance control — system for apartment buildings will be found in U.S. Pat. No. 3,484,561 to J. T. Matthews, issued on Dec. 16, 1969 and assigned to the present assignee.

The control arrangement of that system uses individual pushbuttons, mounted on panels at each entrance of the building along the directory panels, for the selection of the desired apartment by a visitor in the lobby. However, while the arrangement shown in the Matthews patent in all other respects is entirely satisfactory, a shortcoming of this arrangement resides in the amount of cabling required between the building lobby and the common switching equipment, which latter equipment is usually located in a utility room in the basement of the building. It is clear that in the system shown in the patent there have to be at least as many selecting conductors from the foyer to the common switching equipment, as there are apartments, and in larger buildings the number of apartments may be fairly high. Moreover the numerous panels on which these pushbutton panels are mounted take up an increasing amount of wall space the larger the size of the apartment building; this is not only esthetically undesirable but it also requires the visitor to search for and depress a particular one of a multitude of numbered pushbuttons.

In U.S. Pat. No. 3,557,318 to J. J. Buonsante, issued Jan. 19, 1971, an apartment house telephone and entrance control system has been disclosed which is similar to the system of the Matthews patent in many respects. In the system disclosed by Buonsante the use of individual pushbuttons per apartment is avoided by reverting to a multifrequency signaling arrangment requiring a multifrequency ("Touch Calling") keypad unit at the transmitting end, that is in the lobby, and a multifrequency receiver at the switching equipment end. While this arrangement is not subject to the drawbacks mentioned above this advantage is offset by the high cost and the complexity of the multifrequency signaling equipment involved which make the use of this technique uneconomical for local distances such as, for instance, between the ground floor and the basement of a building.

OBJECTS AND SUMMARY OF THE INVENTION

Generally speaking, therefore, it is an object of the invention to provide a novel and improved arrangement for the selection of a desired one of a number of operable devices which takes advantage of keypads while at the same time obviating the use of multifrequency sending or receiving equipment.

It is a further object of the invention to provide a selection arrangement of this kind in door intercom systems for apartment buildings in which the operable device is a relay or other switching device by means of which the corresponding desired apartment is signalled.

With the foregoing and other objects in mind the invention briefly provides for an arrangement in which the operable devices — the line relays in the case of a door intercom system — are connected in a circuit matrix, and which has digit stores, one for each digit dialed, by means of which one of the first-coordinate and one of the second-coordinate points of access of the matrix are uniquely selected. This selection technique is considerably simpler and more economical than the "straight-forward" type selection and, as will be shown hereinafter, it also provides for considerable flexibility as to system size. In the embodiment of the invention described herein each of the digit stores is formed by a set of storage relays whose contacts are connected in relay tree fashion, with the aforementioned matrix being accessed, at its two coordinate ends, from these relay trees. Also coding or conversion means are provided by means of which the information received from the contacts of the keypad or pushbutton dial is converted into a combinational code which, in parallel mode, is sequentially impressed on the various digit stores under the control of sequencing circuitry.

The pushbutton dial may have ten individual contacts, one for each pushbutton. However, in the preferred embodiment of the invention described hereinafter a keypad is used which is similar in mechanical design to the keypads of the well-known "Touch Calling" type as widely used today for DTMF (dual tone multifrequency) dialing in telephone systems. In the keypads of the kind just mentioned the keys, or pushbuttons, are typically arranged in a coordinate array, usually with three keys in each row and four keys in each column. At one or the other end of each of these rows and columns an electrical contact is accessibly provided along the periphery of the keypad and these contacts are mechanically linked to the keys, for instance, by cam shafts in such a way that upon actuation of any one of these keys both the contact associated with the corresponding column and the contact associated with the corresponding row, and in addition a common contact, are actuated. The DTMF keypads or dials of this general kind typically carry on their under side a printed circuit card on which the electrical components of the DTMF oscillator are mounted. The tank circuits of this oscillator are selectively closed by the selective operation of the contacts just referred to so that in response to the actuation of one of the pushbuttons the corresponding 1-out-of-3 low voice frequencies and simultaneously the corresponding 1-out-of-4 high voice frequencies are transmitted over the subscriber line to the "Touch Calling" receiver in the switching equipment. The oscillator itself is started by the above mentioned common contact.

In the keypad unit used in the embodiment described herein the oscillator card is not required and, instead there is mounted on the bottom side of the keypad a printed circuit card carrying the circuitry which serves to convert the 1-out-of-$x$ plus 1-out-of-$y$ outputs obtained from the above-mentioned row and column contacts of the keypad to a preferably binary form. More particularly, in the D.C. controlled receiving equipment of the present embodiment, in which the aforementioned keypad unit is designed to operate, the keyed digits are stored in 1-or-2-out-of-4, or "codel," form. This notation is essentially a four-bit binary code in which only those combinations containing a single 1 or two 1's are used. With this "codel" type of coding, therefore, only 10 different signals — rather than the 15 or 16 which would be provided by a complete four-bit binary code — can be handled, but then no more than ten different signals are required in decimal controlled systems of this kind and only four conductors are needed for the selective transmission of these signals in "codel" form.

The aforementioned keypad unit by itself has been described and claimed in copending U.S. Pat. application Ser. No. 275,023 for a Keypad Control Arrangement, filed by G. Verbaas under even date and assigned to the present assignee.

BRIEF DESCRIPTION OF THE DRAWINGS

The invention will be best understood by reference to the accompanying drawings in which a preferred embodiment has been illustrated by way of example.

In the drawings:

FIG. 4 illustrates the mechanical structure of the keypad unit as shown in the above copending application of G. Verbass.

FIG. 5 is a diagrammatic showing of the keypad, also as illustrated in the copending application.

FIG. 6 is a translation table which is likewise illustrated in the copending application.

DESCRIPTION OF PREFERRED EMBODIMENT

Figure 1:
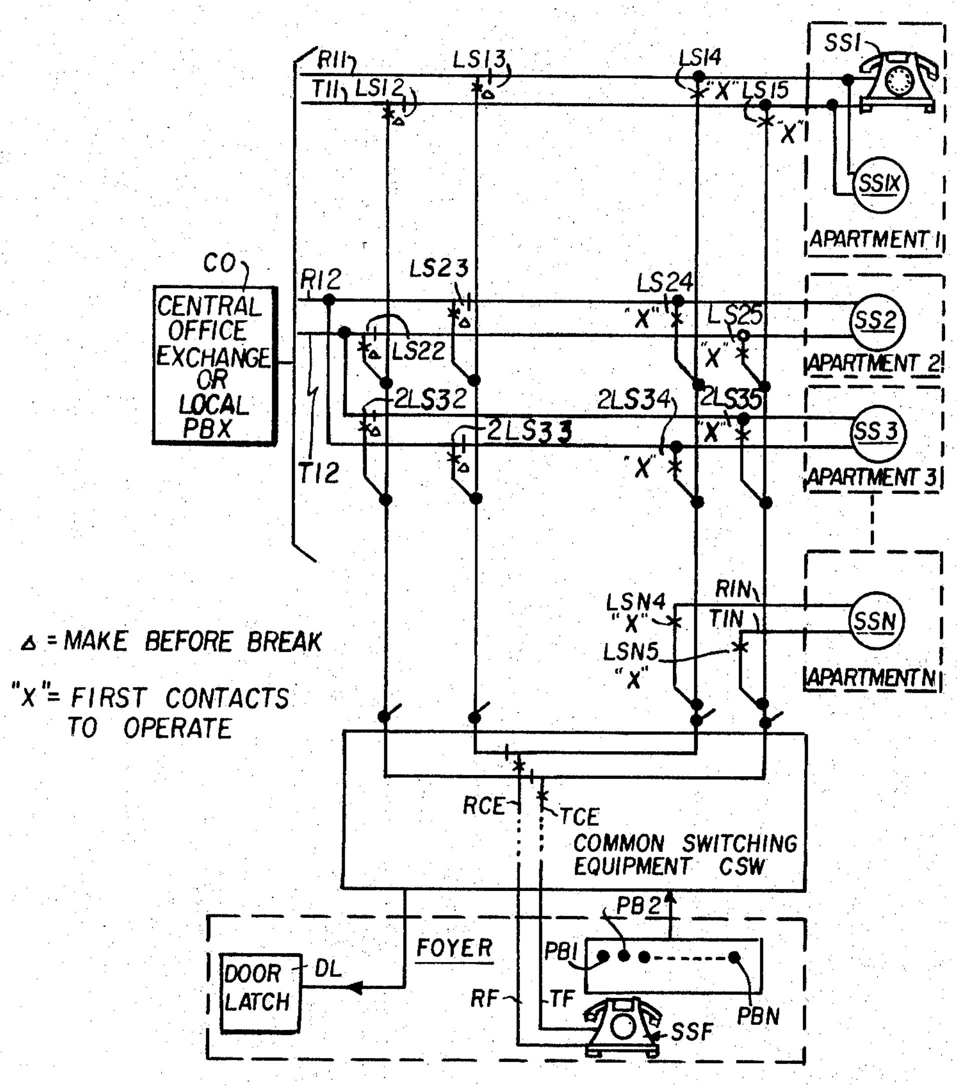
FIG. 1 (PRIOR ART)
FIG. 1, which is labelled "Prior Art," shows an apartment telephone intercom and door release system as described in the aforementioned U.S. Pat. No. 3,484,561, of which the present invention, in one aspect thereof, constitutes an improvement.

Before proceeding with the description of the embodiment of the invention considered herein, reference is made to FIG. 1, labelled "Prior Art," which shows the apartment telephone intercom and door release system of the aforementioned United States patent to Matthews in block diagram form. An explanation of this system as a whole will be found in the description of the Matthews patent. However, attention is directed to the bottom portion of FIG. 1 which illustrates the equipment in the foyer of the apartment building and shows in particular the pushbuttons PB1, PB2 to PBN which are provided on an individual basis, one pushbutton separately for each tenant of the apartment building, to individually operate by way of a corresponding number of conductors, the respective line relays LS over the contacts of which access is provided to the respective apartments. The windings of these LS relays and the conductors over which they are operated are not particularly shown in FIG. 1 but they are represented in another drawing of the patent.

A. OVERALL DESCRIPTION OF THE SYSTEM

As indicated above, the embodiment of the present invention as described herein, in one of its aspects, is an improvement of the system of the Matthews patent and it is assumed herein that common switching equipment similar in most respects to that disclosed in the patent — and supplemented by the control arrangement described hereinbelow — is employed. In the embodiment of the system described hereinafter all the features of the system according to the Matthews patent are retained, but, as will be appreciated, keypad control instead of individual pushbutton control is used. The keypads may be mounted, with the handset — or, alternatively, a speaker microphone — on a panel provided at the entrance to the apartment building. In fact, in the embodiment described hereinbelow it is assumed that the building has three entrances, each being equipped with such a panel. A visitor at any of these entrances is thus able to key the number assigned to the desired resident on the keypad and the connection is then automatically completed, with a result where individual pushbuttons for each apartment are used. However, as indicated before, the keypad control arrangement of the present invention eliminates the need for pushbutton panels and its reduces the amount of cabling from the entrances to the common equipment in the utility room. Once the keypad at one entrance has been taken into use the system is automatically busied against seizure by the keypads at the other entrances.

The selecting arrangement described hereinafter uses a number of modular units in the form of printed cards, namely one control relay card, up to four selection digit storage relay cards and any desired number, say 1 to 7, auxiliary digit storage relay cards. The keypad for each entrance of the apartment building is connected in such a way that a visitor can key the digits — up to four in the present example — of the number assigned to the resident desired; and as each digit is keyed it is stored in the relays of the appropriate selection digit store.

Two numbering systems are available. One is the Coded Numbering Plan which consists of two digits for up to 100 lines or three digits for up to 1,000 lines. With this plan the number assigned to each apartment does not have any relation to its location in the building.

According to the second plan, referred to herein as the Translation Numbering Plan, the number is assigned to each apartment in accordance with the floor on which it is located and also in accordance with its position on the floor. For example, the fifth apartment on the seventh floor would be assigned the number 705. For the Translation Numbering Plan a three digit number is required for up to nine floors and for more than nine floors a fourth digit numbering plan is provided.

As has been pointed out before, according to a feature of the present invention the line relays are provided in the form of a circuit matrix and they have been so shown in the drawings. It should be noted, however, that while, circuitwise, the line relays are thus connected in a coordinate array the physical mounting of the relays must not necessarily be of coordinate structure, that is, the relays must be mounted in any convenient physical location, e.g. on individual mounting bars corresponding, say, to the horizontals of the above matrix.

For the Coded Numbering Plan the equipped line relays are arranged into "horizontal" groups of ten relays by splitting the battery commons for the relays at every 10th relay. For the Translation Numbering Plan the line relays are arranged into the size of "horizontal" groups required for each floor up to a maximum of 29 relays in one group.

Each of the above groups is multiplied, vertical 1 to vertical 1, vertical 2 to vertical 2, etc. as required, so that each group is interfaced with, that is, accessed by, the last digit selection card of the system.

The desired group of line relays is selected by extending battery via tree configuration circuitry in the first, or second, selection digit store card (depending on whether the system has a two, three or four digit number scheme) to the common battery wiring of the relay group.

When the last digit is stored, tree configuration circuitry in the last selection card extends ground to the selected relay of the group. As battery is connected to only one of all the groups in multiple, only one line relay in the system can be operated at one time.

The third type of card, the auxiliary digit store card, is used to increase the capacity of the system by connecting the cards so that they interface with the second digit selection card of a Coded three digit numbering system to increase the capacity of the system by 100 lines for each card.

In the case of the Translation Numbering Plan auxiliary cards are associated with the second digit selection card to increase the capacity by 10 floors per card. Also by interfacing the auxiliary card with the last digit selection card, the apartments per floor will be increased by 10 ines for each card.

In the present arrangement miniature relays, preferably of the HQA type (Class H), are used and the cards referred to above are mounted in two card assembly units. Card assembly I unit mounts one control relay card and up to three selection digit store cards. The card assembly II unit mounts four cards, either selection or auxiliary, as required.

B. DETAILED DESCRIPTION OF THE SYSTEM

Referring now to the circuit schematic, FIG. 2, the keypad unit shown therein provides for circuitry by means of which the 1-out-of-$x$ plus 1-out-of-$y$ output of a keypad is converted to the "codel" output form called for by the receiving or storage apparatus of the system disclosed hereinafter by way of example.

It might be thought that such a conversion arrangement requires as many relays as there are keypad contacts, that is, seven relays in the case of a 4×3 keypad ($x$=4, $y$=3, thus $x$+$y$=7). However, by means of the unique approach illustrated in FIG. 2 and claimed in the aforementioned corresponding application it is possible in the assumed example to reduce the number of relays required for the conversion to three or even two. More particularly, one of the two coordinate sets of contacts of the keypad, for example, the column contacts, are connected to control a corresponding number of relays, for example, three — or even a lesser number, two, as demonstrated in the copending application — while the control potential, say ground, is connected through the contacts of the other set of keypad contacts, a treetype array of contacts of the aforementioned relays, and feedback preventing rectifying means in series to the output leads, thereby to selectively activate these leads. Preferably, this "buffer" circuitry is mounted on a printed circuit card which, in turn, is secured to the bottom of the keypad.

Figure 2:
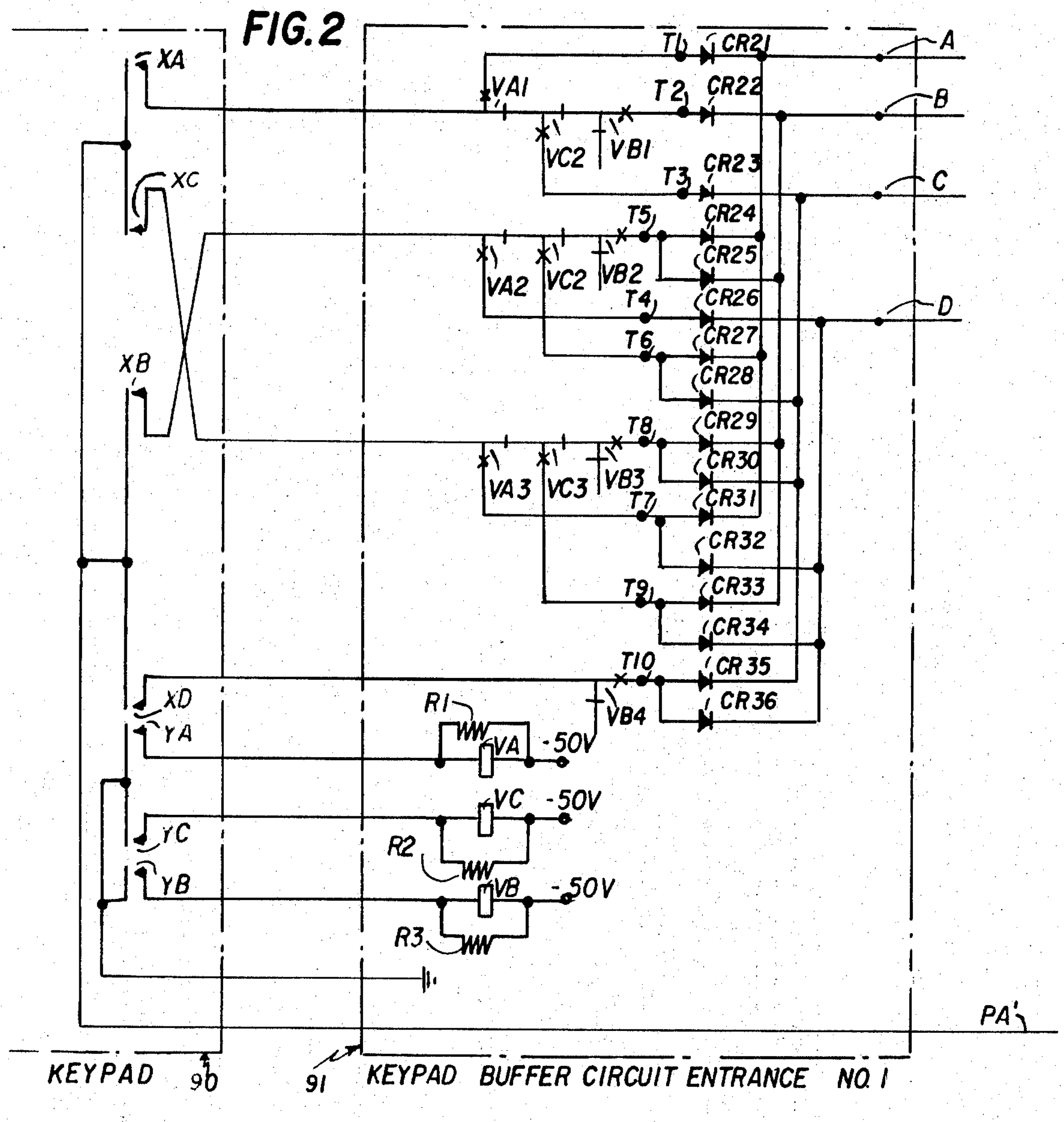
FIG. 2 shows the circuit of the keypad unit, including the circuit of the keypad itself and that of the keypad buffer circuit — all as shown in the aforementioned copending application of G. Verbass.

On the left-hand side of FIG. 2 the two sets of contacts of keypad 90 are shown, namely the set of four horizontal or row contacts XA, XB, XC and XD and the set of three column or vertical contacts YA, YB and YC. All of these contacts are of the normally open or "make" type — and preferably of the twin-contact type — and each of them is in the normal condition of the circuit connected to ground.

On the right side of FIG. 1 there is shown the buffer circuit 91 comprising three conversion relays VA, VB and VC and their associated shunt resistances R1, R2 and R3, and also a set of sixteen diodes CR21 to CR36. The right-hand terminals of the windings of all three relays, as viewed in FIG. 1, are connected to the negative side of the 50 volt system battery. As shown in the figure, each of the three relays VA, VB, VC is serially connected to, and controlled by, the corresponding vertical keypad contact YA, YB, YC. Each of the relays has a number of break-make contacts designated VA1 to VA3, VB1 to VB4 and VC1 to VC3 and these contacts are connected to each other, generally speaking, in relay tree fashion. More particularly, contacts VA1, VC1 and VB1 form an individual tree configuration which is connected at its input end to horizontal keypad contact XA and at its output end to circuit points T1, T2, T3; relay contacts VA2, VC2 and VB2 form another individual tree configuration which is connected at its input end to horizontal keypad contact XC and at its output end to circuit points T4, T5 and T6, relay contacts VA3, VC3 and VB3 form another tree configuration which is connected at its input end to horizontal keypad contact XB and at its output end to circuit points T7, T8 and T9. In addition, the make portion of relay contact VB4 is connected on one side to horizontal keypad contact XD and on the other side to circuit point T10. It may be added that although all relays in FIG. 1 have been assumed to be provided with break-make combinations throughout, it will be clear that the various unused portions of some of these contacts could be omitted. This incidentally, applies also to the relays mounted on the other printed circuit cards of the present system, such as those shown in FIGS. 11, 11*a*, 13 and 24.

As will become clearer yet from the description of the example given hereinafter of the operation of the circuit, the result of this overall contact arrangement is that, in response to the depression of any of the pushbuttons of the keypad, only the correspondingly numbered one of the 10 circuit points T1 to T10, FIG. 1, will be connected to ground. In this fashion then 1-out-of-*n* selection is provided by the keypad in connection with the conversion relays.

Reference is made at this point to FIGS. 5 and 6. In FIG. 5 the association of two sets of contacts XA, XB, XC, XD and YA, YB, YC, FIG. 1, with the corresponding rows and columns respectively of the keypad has been singled out and represented in diagrammatic fashion. Similarly, in the first two columns of FIG. 6 the pairs of keypad contacts are tabulated which are operated in response to the depression of the ten digit keys respectively. As will be noted from FIGS. 5 and 6, the pushbuttons shown to the left and to the right of the "0" pushbutton are not used since they are not required for the digital control of the present embodiment.

Reverting again to FIG. 2, the sixteen diodes CR21 through CR36 are interposed in forward direction between circuit points T1 to T10 and the "codel" output terminals A, B, C, D — and the output conductors connected thereto — in such a way that the 1-out-of-n ground marking appearing in the manner described above on circuit points T1 to T10 is converted into 1-or-2-out-of-f markings on the four "codel" output conductors. As will become clear hereinafter these output conductors lead to corresponding inputs of the digit storage apparatus of the system, this apparatus being controlled by the ground markings selectively applied, digit-by-digit, to terminals A, B, C, D, FIG. 2.

More specifically it will be noted that circuit points T1, T2, T3 and T4, FIG. 2 each are connected to the left-hand side of only one diode, namely CR21, CR22, CR23 and CR26 respectively, so that in response to the depression of pushbuttons 1, 2, 3, 4 only one of the output conductors A, B, C, D, respectively, has the ground marking applied thereto. On the other hand circuit points T5 to T10 are each connected to a pair of the remaining diodes so that, in view of the multiple connections on the righthand side of the diodes, the depression of any of the pushbuttons 5 to 10 brings about the simultaneous ground-marking, in the pattern shown in the third column of FIG. 6, of two of the four output conductors A, B, C, D. It will also be clear from an inspection of FIG. 2 that the diodes have a backfeed preventing function, i.e. they insure that in spite of the aforementioned multiple connections only the desired output conductor or conductors, and none of the others, are energized with ground.

In the operation of the arrangement of FIG. 2, assuming by way of example that pushbutton 1 has been depressed and that accordingly keypad contacts XA and YA have been actuated, conversion relay VA will be operated in a circuit extending from ground through vertical contact YA, winding of relay VA to battery; and as a result ground is connected to output terminal A, viz. through horizontal conductor XA, the make portion of contact VA1 of relay VA, circuit point T1 and diode CR21. Since neither of the other two relays VB or VC is operated and none of the other three horizontal contacts actuated no other output terminals are marked with ground.

To take another example, assuming pushbutton 5 is depressed and accordingly keypad contacts XB and YB are actuated, it will be appreciated that relay VB will operate over a circuit extending from ground via vertical contact YB and the winding of relay VB to battery; and that accordingly ground marking of both output conductors A and B is effected, namely over the following circuit paths: ground, horizontal keypad contact XB, the break portions of contacts VA2 and VC2, the make portion of contact VB2, circuit point T5, and hence via diode CR24 to output terminal A, and, via diode CR25 to output terminal B. It may be mentioned at this point that the shunt resistances R1, R2 and R3 which are connected in parallel with the windings of relay VA, VC, VB, respectively, are provided for spark protection and that they also render these conversion relays slightly slow-to-release.

Reference finally is made to FIG. 4 which represents a side view of the overall assembly of the preferred physical embodiment of the keypad unit. As will be seen from FIG. 4, conversion relays VA, VB, VC, together with the remaining components of the buffer circuit 91, FIG. 2, are mounted on a printed circuit card 81 which, at 86, in turn is secured to the bottom of the keypad 82 proper in a plane parallel thereto. Relays VA, VB and VC are miniature relays, for example of the HQA type.

1. 100-LINE VERSION.

Figure 7:
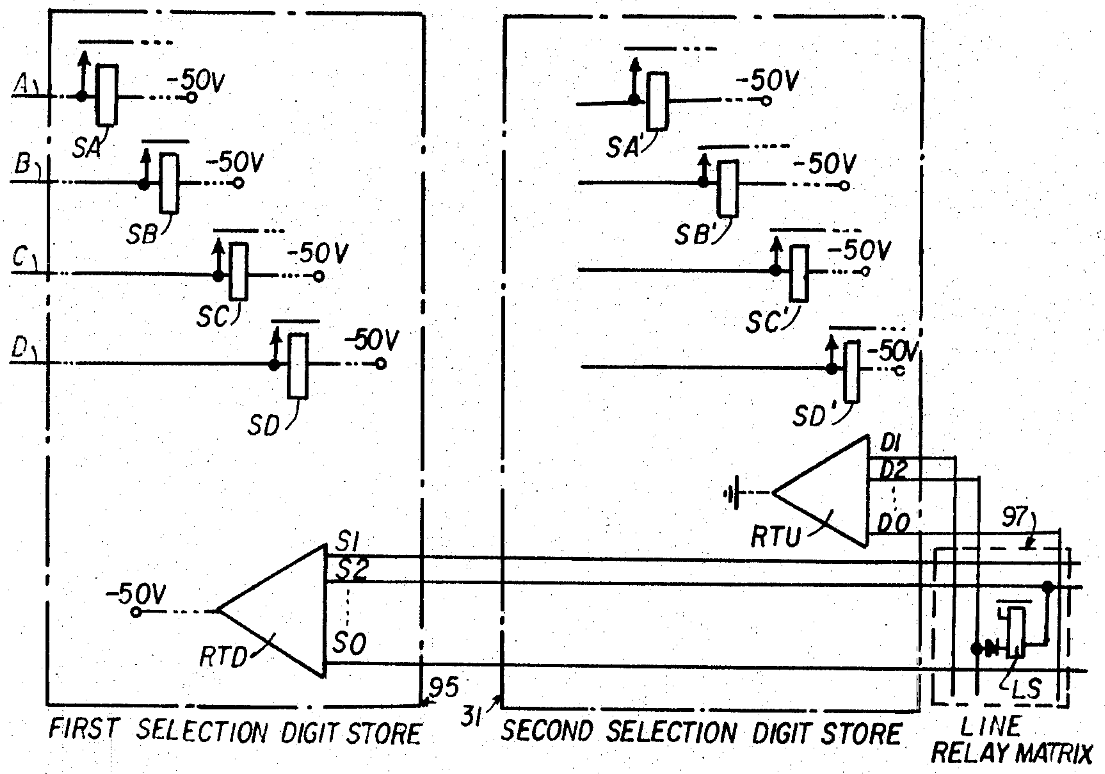
FIG. 7 is a block diagram of a 100-line system according to the present invention, using the Coded Numbering Plan.

FIG. 7 illustrates in block-diagram form receiving circuitry for the 100-line version of the present system, which uses the Coded Numbering Plan. Accordingly the figure shows a first selection digit store 95 having four storage relays SA, SB, SC, SD connected to the four "codel" conductors A, B, C, D, respectively, these conductors being controlled from the correspondingly designated terminals on the right-hand side of FIG. 2; a second selection digit store 31 comprising four units storage relays SA', SB', SC' and SD'; and a line relay matrix 97 including 100 line relays LS and their associated backfeed preventing diodes, as indicated.

As will be noted from FIG. 7, the first digit keyed on keypad 90, FIG. 2, is directly received and stored in "codel" or 1-or-2-out-of-4 form by the relays of the first selection digit store. After these relays have operated and ground has been removed from the "codel" conductors upon release of the key first depressed, conductors A, B, C, D, in a manner which will become clear from the detailed description given hereinbelow, are transferred to the relays of the second selection digit store so that these latter relays are not operated in a "codel" combination corresponding to the second digit keyed on the transmitting keypad. As indicated in FIG. 7, the actuated storage relays of both stores are held in respective locking circuits closed upon operation of the corresponding relays. Apart from these locking contacts no contacts of the digit storage relays have been specifically shown in FIG. 7. However, as diagrammatically indicated in the figure, additional contacts of first digit relays SA to SD are connected so as to form a relay contact tree RTD which at its input end is terminated in negative battery. Likewise, additional contacts of second digit storage relays SA' to SD' are connected to form a relay contact tree RTU which at its input end is connected to ground. As shown in FIG. 7, relay contact tree RTD at its output end has ten conductors S2, S2 to S0 connected thereto; similarly the output of relay contact tree RTU is connected to ten conductors D1, D2 to D0. As will be seen moreover from FIG. 7, the last mentioned conductors S1 to S0 form the horizontal inputs to line relay matrix 97 and conductors D1 to D0 form the vertical conductors of this matrix. For particulars of the relay contact trees schematically illustrated in FIG. 7, reference is made to the detailed showing of these contact trees in FIG. 13.

From the foregoing it will be seen that in response to two successive key depressions, for the first digit and second digit respectively, at keypad 90, one of the 100-line relays of the line relay matrix is uniquely selected. Assuming for instance that both the first digit and the second digit set up by means of the keypad is a "2" then this operation will result in the selection of line relay LS22, FIG. 7. More particularly the operating circuit of line relay LS22 extends from ground at the input of relay contact tree RTU via conductor D2, backfeed preventing diode, lower winding of line relay LS22, conductor S2, relay contact tree RTD, to negative battery. Relay LS22, upon operation, locks as indicated over the upper winding.

Figure 8:
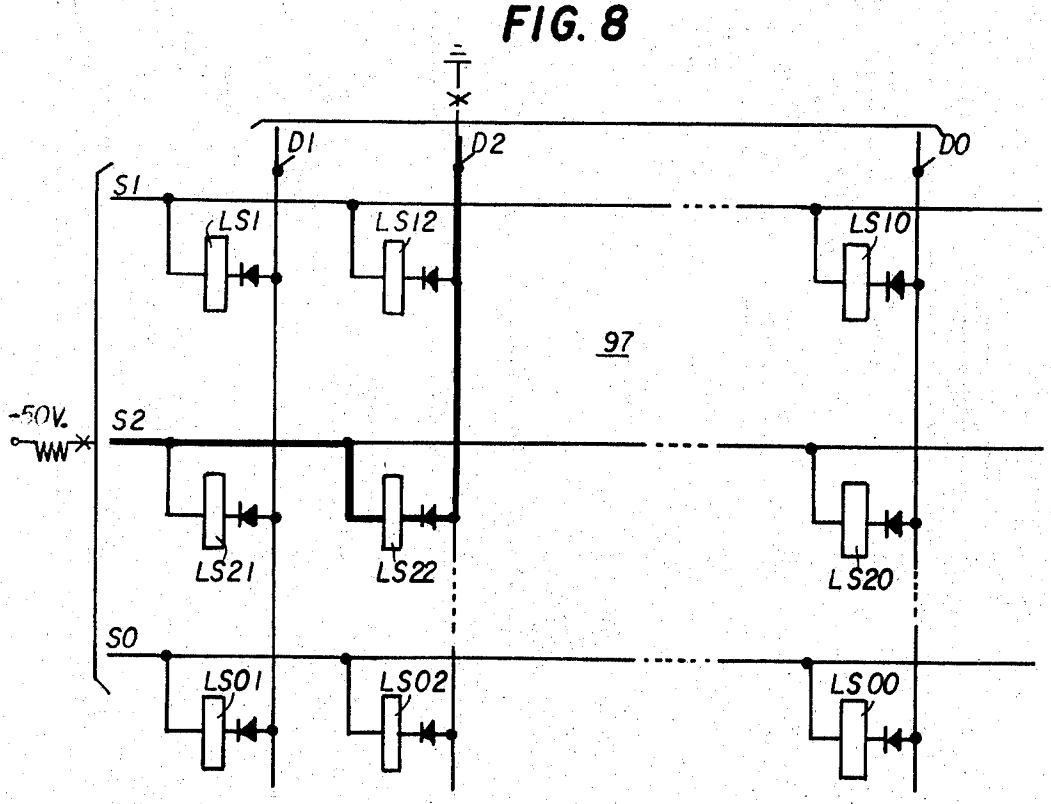
FIG. 8 shows the line relay matrix for the 100-line system of FIG. 7.

In FIG. 8 line relay matrix has been shown in somewhat greater detail. The holding windings of the line relays have, however, not been shown in FIG. 8.

2. 500-LINE VERSION

Figure 9:
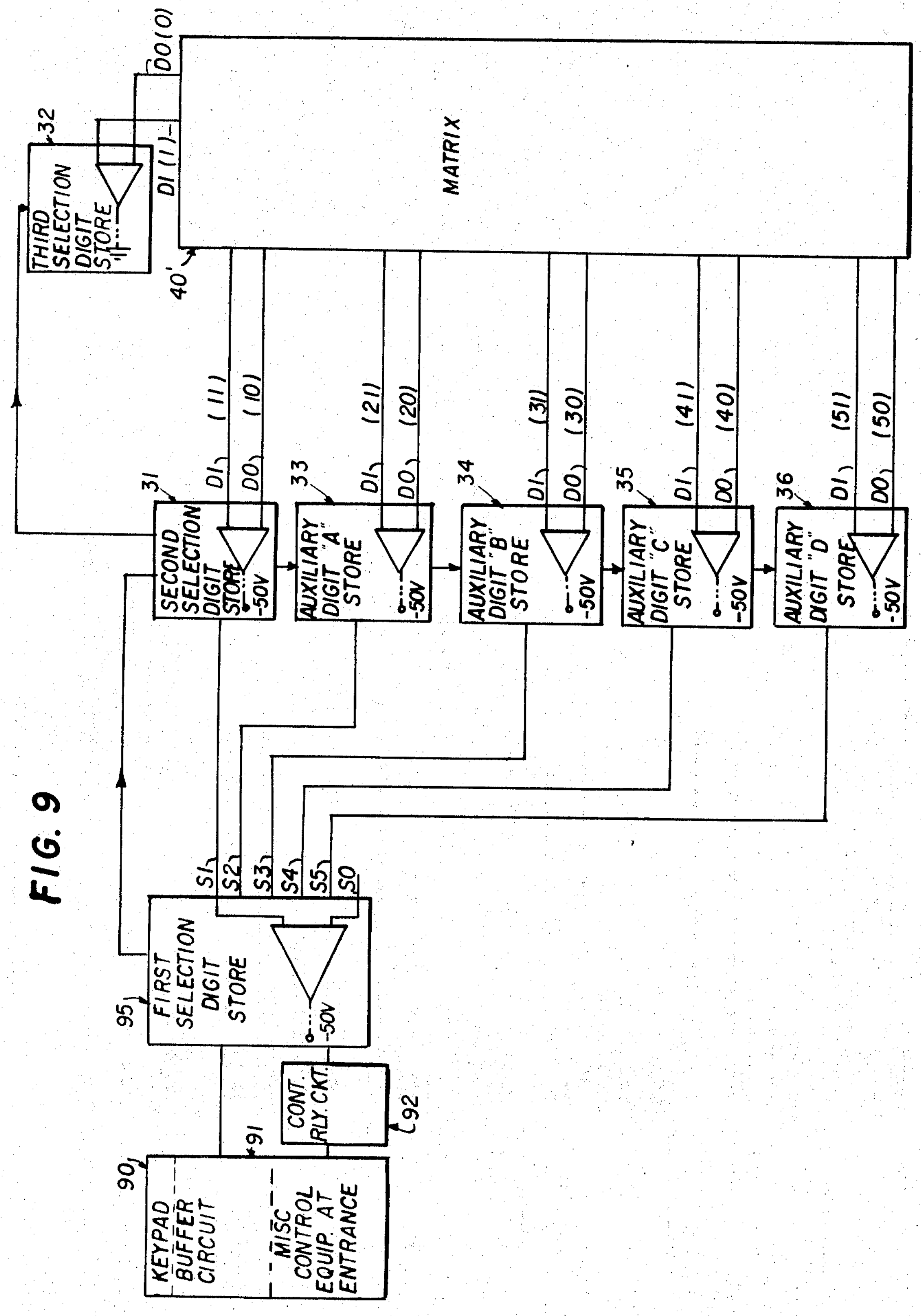
FIG. 9 is a block diagram for a 500-line system according to the invention, also using the Coded Numbering Plan.

FIG. 9 shows the block diagram of a system which also uses the Coded Numbering Plan but is designed to serve 500 lines. It will be appreciated that for the selection of more than 100 (and less than 1,000) lines three digits are required.

As will be seen from FIG. 9, this system is controlled — as is the previously described 100-line system — by keypad 90 in conjunction with buffer circuit 91. The figure also shows miscellaneous control equipment provided at the entrance, as well as control relay circuit 92 the function of which will be described in greater detail hereinbelow. In view of the 3-digit character of the system there is required, in addition to the first selection digit store 95 and the second selection digit store 31, a third selection digit store 32. All of these stores — and, incidentally, also the auxiliary digit stores described below — are provided with digit storage relays similar to relays SA, SB, SC, SD or SA', SB', SC', SD' shown in FIG. 7. While the corresponding relays have not been represented in detail in the digit stores of FIG. 9, the figure indicates, in diagrammatic form, the trees or pyramids formed by the contacts of these relays; these contact trees generally correspond to these designated RTD and RTU in FIG. 7.

It will be noted that in the 500-line system, FIG. 9, four auxiliary digit stores, 33, 34, 35 and 36 are provided and that each of these stores augments the capacity of the system by 100 lines. The auxiliary digit store circuitry will be explained in greater detail hereinbelow. Suffice it to say at this point that these stores are generally similar in circuit structure to the selection digit stores except that they do not include a transfer relay as required to transfer, upon receipt of the corresponding digit, the incoming "codel" conductors to the next following selection stage. The connections between the individual stores shown in FIG. 9 are such that upon receipt of the first digit the first selection digit store acts to select the desired one of the digit stores of the second stage and, upon release of the depressed pushbutton at keypad 90, transfer the "codel" conductors incoming from buffer circuit 91, to the second selection digit store 31. Similarly, second selection digit store 31 transfers the incoming "codel" conductors to third selection store 32, after the second digit has been dialed. In addition each selection digit store, and likewise each auxiliary digit store, is provided with circuitry for passing the combination stored therein to the auxiliary store controlled thereby. Thus, as indicated by the diagrammatic showing of FIG. 9, the setting of the storage relays in second selection digit store 31 is passed to auxiliary digit store 33 and so on down the line to auxiliary digit stores 34, 35 and 36 to operate the storage relays of all these stores in identical combinations.

The matrix 40', FIG. 9, has 50 horizontal groups of line relays (not shown in FIG. 9) which are selected over leads D1(11) to D0(50), respectively. The individual relay in each of these groups is selected by means of vertical conductors D1(1) through D0(0) which are accessed by the relay contact tree in third selection digit store 32, with the result that only one of the total number of line relays — 500 in the present example — is selected.

3. 9 × 29 VERSION

Figure 10:
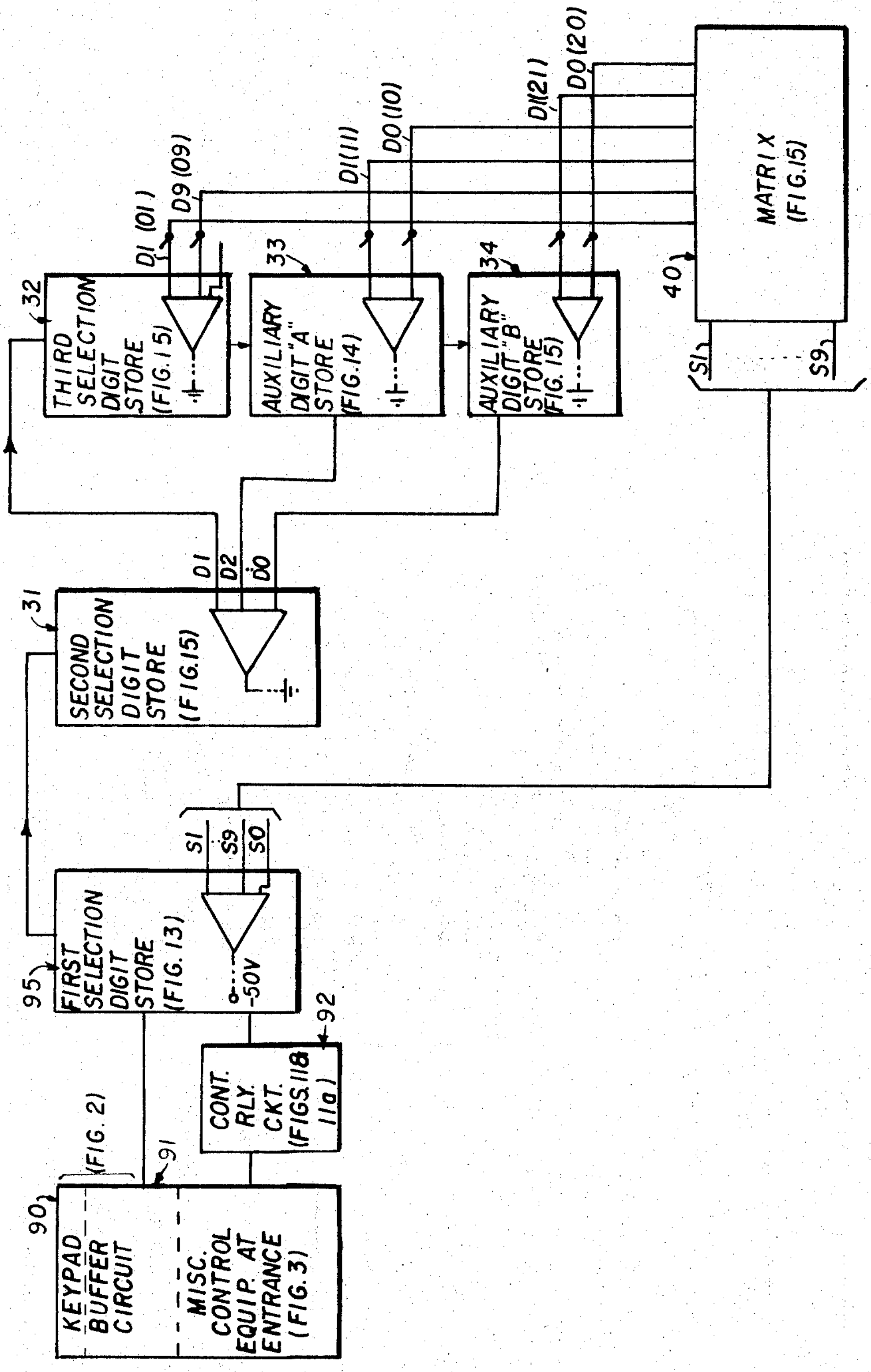
FIG. 10 is a block diagram of a system according to the invention which accommodates a maximum of nine floors and 29 apartments on each floor; the system thus follows a Translation Numbering Plan.

The system shown by way of example in FIG. 10 uses the Translation Numbering Plan and it is designed to accommodate 9 floors and 29 apartments on each floor. The receiving apparatus of the system of FIG. 10 will be described more fully hereinafter in connection with the detailed circuit diagrams shown in FIGS. 11, 11a, 12, 13, 14 and 15, and corresponding references to these figures have been included in the various blocks shown in FIG. 10. As to the Translation Numbering Plan it will be appreciated that the accepted floor numbering such as 104, 516, 823, etc. precludes the use of a 2-digit numbering system. As a result 3-digit numbering is used for locations of up to 9 floors (as evidenced by FIG. 10) and 4-digit numbering is used where the building has more than 9 floors (as further explained below in connection with FIG. 16).

Reverting now to FIG. 10 it will be noted that a first selection digit store 95, a second selection digit store 31 and a third selection digit store 32 are provided as in FIG. 9, these three selection digit stores again being controlled by keypad 90 with buffer circuit 91, control relay circuit 92 and miscellaneous entrance control equipment — all as briefly explained above in connection with FIG. 9, However, in the instant case, while no auxiliary digit stores are required in the second selection stage, two such auxiliary digit stores, 33 and 34 respectively, are provided for the third stage. More particularly, the third selection digit store 32 is controlled over the DQ output of the contact tree of second selection digit store 31; auxiliary digit store 33 is controlled over a similar output D1′ and auxiliary digit store 34 over a corresponding output D2′.

The matrix, designated 40, has nine horizontal conductors S1 to S9 (and corresponding groups of 29 line relays, not shown in FIG. 10) and these nine conductors are accessed by battery through the contact pyramid of first selection digit store 95. The vertical conductors of the matrix consist of a first group of nine conductors D1(01) to D9(09), a second group of ten conductors D1(11) to D0(10), and a third group of ten conductors D1(21) to D0(20), and these 29 conductors are accessed by the contact trees of third stage stores 32, 33 and 34, respectively. The capacity afforded by matrix 40, FIG. 10, therefore, is nine floors and 29 apartments for each floor.

It may be noted in parenthesis that the ground connections at the apices of the contact pyramides of stores 32, 33 and 34 are derived through the contact pyramid of second selection digit store 31, namely by way of conductors D1, D2 and D0, respectively. The same applies in a generally analogous way to the battery connections of the contact pyramids in FIG. 9 and to both the ground and the battery connections in FIG. 16. In the simplified representation used in each of these figures this circuit detail has not been illustrated.

The circuit of the 9 × 29 configuration of the system shown diagrammatically in FIG. 10 will be described in greater detail with reference to FIGS. 11, 11*a*, 12, 13, 14 and 15, which show the receiving end of the present control arrangement, taken in conjunction with FIGS. 2 and 3 which show the transmitting end and have been described in detail hereinabove. In explaining the operation of these circuits it will be assumed that a visitor originates a call from the keypad provided at entrance No. 1 and that the panel mounting the keypad at this entrance is arranged for handset operation.

Assuming that digit "1" is keyed as the first digit, the operation of the corresponding digit key (pushbutton) causes contacts XA and YA on the keypad, FIG. 2, to operate. At contact YA ground is closed to the winding of relay VA and battery so that relay VA operates. Due to the operation of contact XA and the closure of contact 22, FIG. 3, when the visitor lifts the handset from the switchhook of the entrance panel, the following circuit is closed for the lower winding of entrance No. 1 control relay EA, FIG. 11: ground, break contacts RS6, HD1, FIG. 11a, break contact RS1, FIG. 11, lower winding or relay EA, break contacts EC5, EB5, conductor ER′, hookswitch contact 22, FIG. 3 (strap S is added only in case a speaker microphone rather than handset panels are used), conductor HA′, break contact HD3, FIG. 11, conductor PA′, FIGS. 3 and 2, keypad contact XA, make contact VA1, T1, CR2, "codel" conductor "A," plug-in terminal 14, FIG. 13, break contact DS4, CR41, plug-in terminal 24, conductor BA, break contacts EG1 and EG6 in parallel (FIG. 11a), terminal RB, resistance R13, battery.

Figure 11:
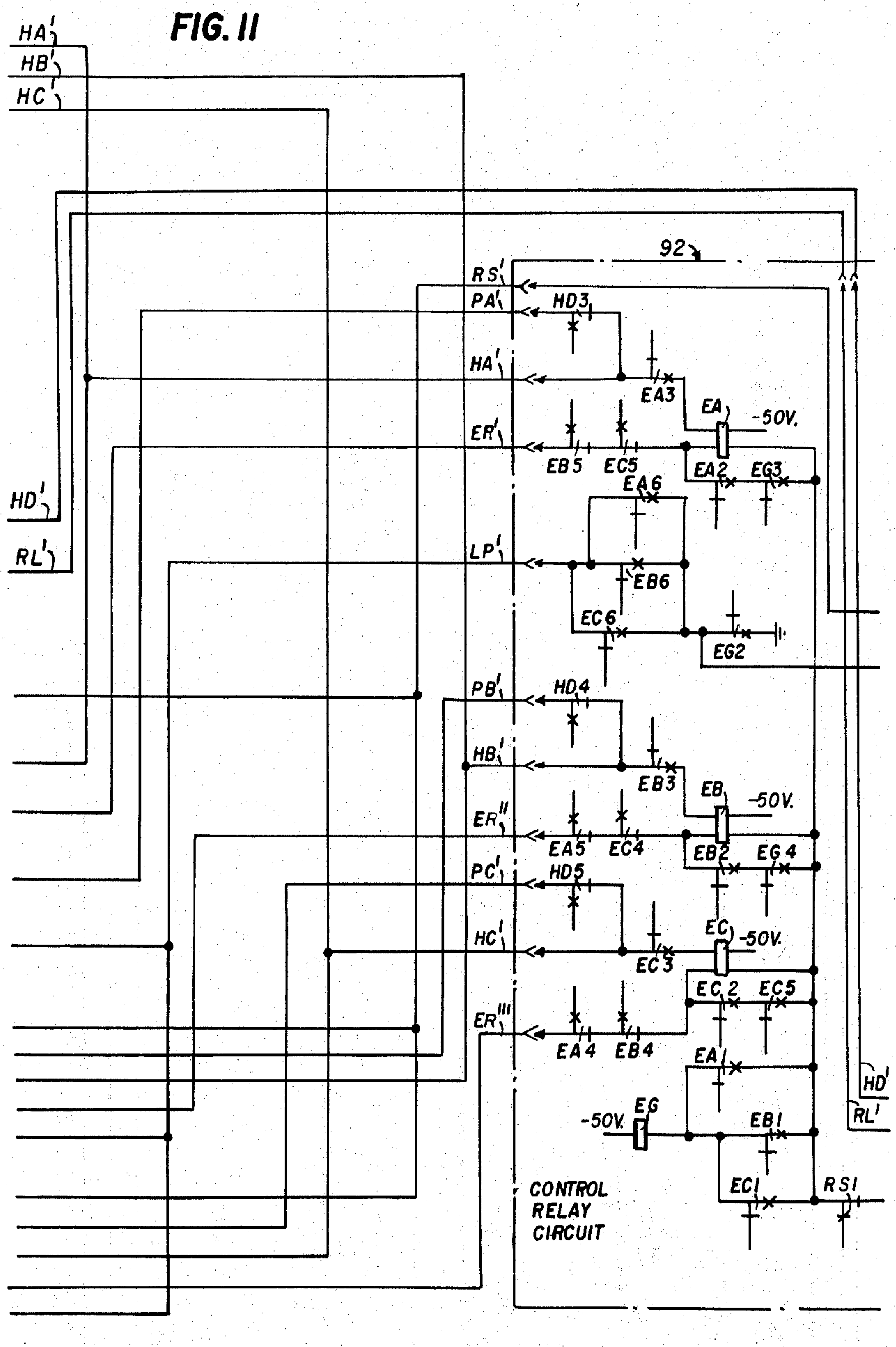
FIGS. 11 and 11a illustrate the details of a control relay circuit with particular application to the 9 × 29 system shown in FIG. 10.
Figure 11A:
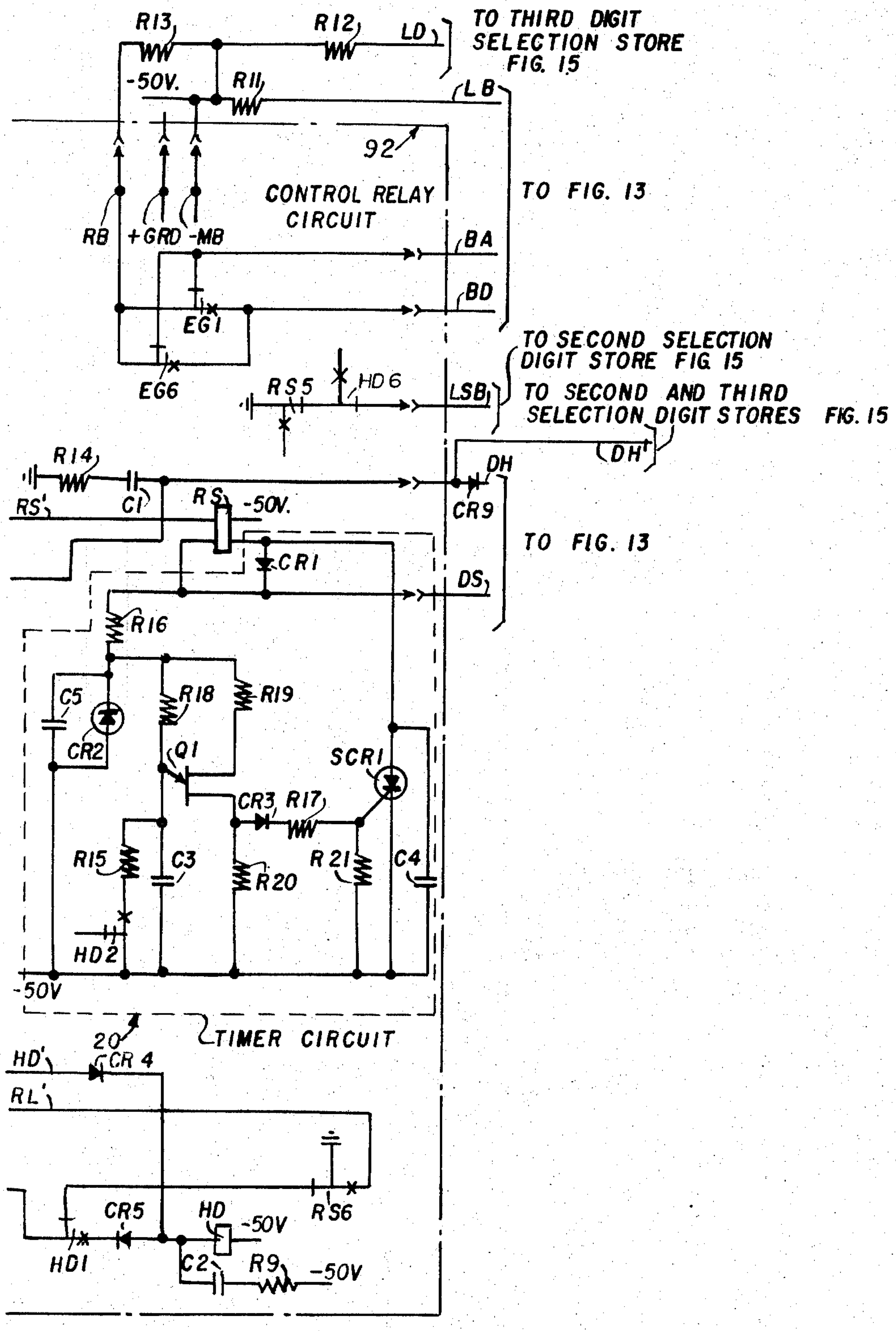

Relay EA in operating in this circuit, at its contact EA1 closes a circuit to the winding of relay EG, FIG. 11, from ground, break contacts RS6 and HD1, FIG. 11a, through break contact RS1, FIG. 11, make contact EB1 to the winding of relay EG and battery; relay EG operates in this circuit. Make contact EA2 of relay EA prepares a short circuit for the lower winding of this relay. At its make contact EA3, relay EA completes a holding circuit for itself which extends over hookswitch contact 22, FIG. 2, and both windings of relay EA in series. At break contact EA4 a point in the operating circuit of entrance No. 3 control relay EC is opened so that the system is busied for seizure from entrance No. 3. Similarly at break contact EA5 a point in the operating circuit of relay EB is opened so as to render the system busy against seizure from entrance No. 2. Make contact EA6 prepares a circuit for in-service lamp 21, FIG. 3.

Figures 3, 12:
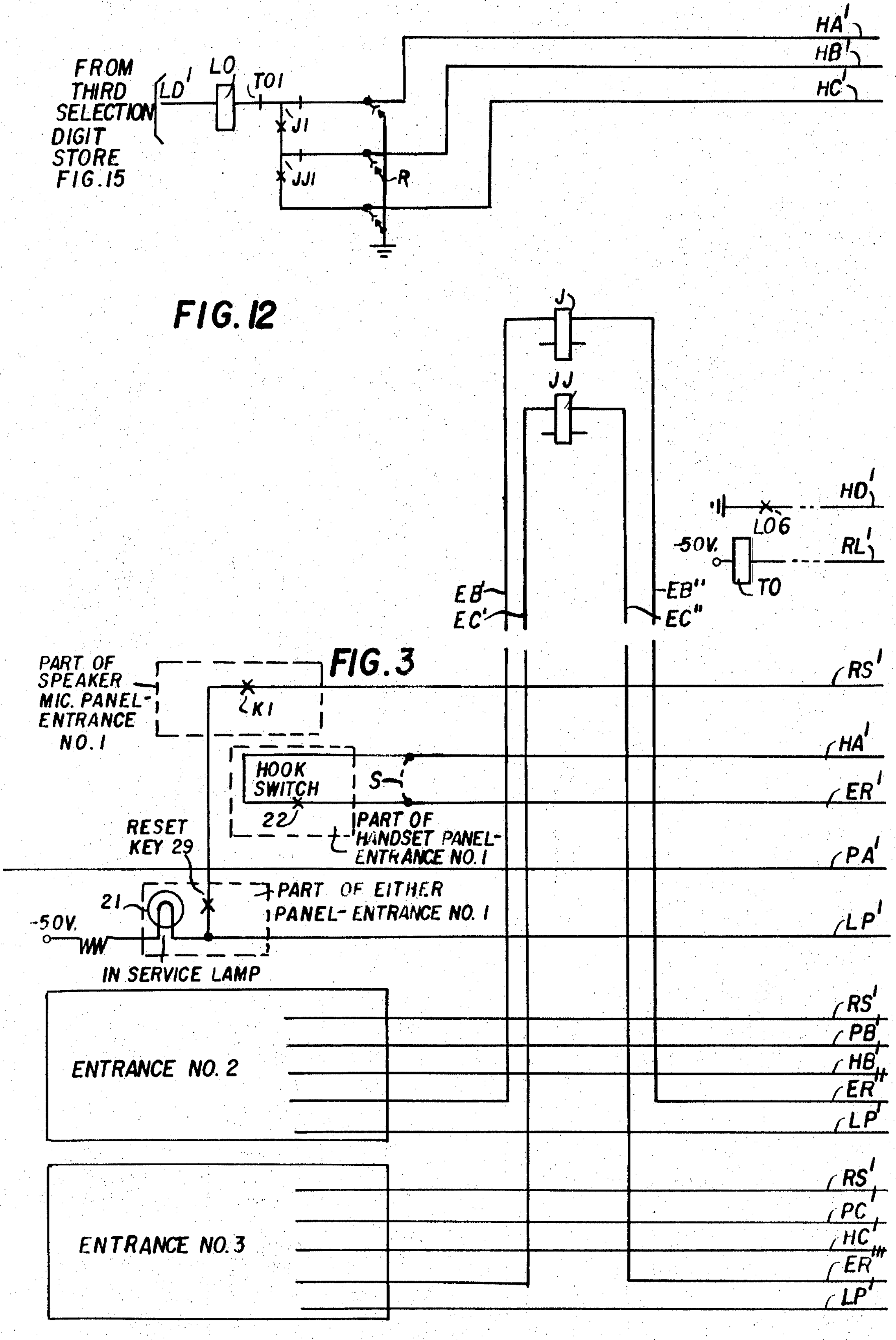
FIG. 3 illustrates part of the circuit of miscellaneous entrance control equipment, both for hookswitch operation and for speaker microphone operation.
FIG. 12 shows part of the circuitry of the common equipment of the door intercom system.
Figure 13:
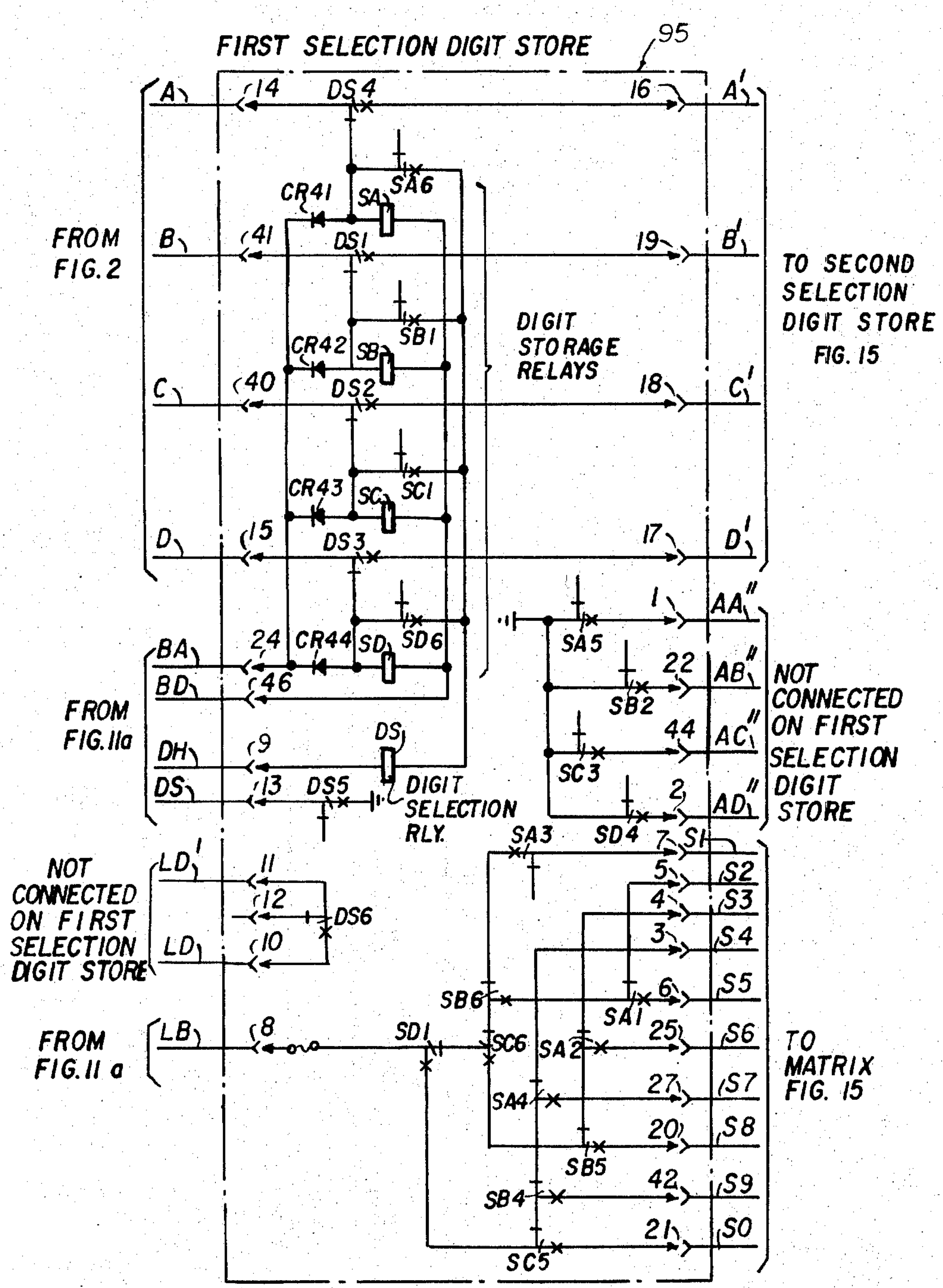
FIG. 13 shows the circuit particulars of the first selection digit store, with particular reference to the 9 × 29 system of FIG. 10.

Relay EG in operating, at contacts EG1 and EG6 transfers battery from the above traced operating circuit of relay EA to lead BD, thereby supplying operating battery to the digit storage relays (SA to SD) in first selection digit store, FIG. 13. Since digit 1 was keyed, relay SA operates over the following circuit: ground, break contacts RS6 and HD1, FIG. 11a, break contact RS1, FIG. 11, make contacts EG3 and EA2, break contacts EC5 and EB5, conductor ER′, hookswitch contact 22, FIG. 3, conductor HA′, break contact HD3, FIG. 11, conductor PA′, keypad contact XA, FIG. 2, make contact VA1, T1, CR21, conductor A, break contact DS4, FIG. 13, winding SA, conductor BD, make contacts EG1 and EG6 in parallel (FIG. 11*a*) RB, resistance R13, battery. The designation of the plug-in connector terminals of the digit store have not been included in the tracing of the foregoing circuit and they will likewise be omitted in the description except when required.

Also upon the operation of relay EG, ground is extended at EG2, FIG. 11, to conductor DH′, FIG. 11*a*, and via diode CR9, to conductor DH, and also via make contact EA6 to conductor LP′ to light the in-service lamp 21, FIG. 3, on all entrance panels. With make contact EA2 closed, a short circuit is completed at make contact EG3 across the lower winding of relay EA to provide a direct ground for the above-mentioned operation of relay SA, FIG. 13, and also to cause relay DS, FIG. 13, to be short circuited as long as the digit key is depressed. The remaining contacts of relay EG perform functions in conjunction with the other two entrance control relays EB and EC.

It will be noted from the foregoing description that the digit storage relays, FIG. 13, — in the present instance storage relay SA — are prevented from operating until relays EA and EG in the control circuit have operated. This insures, among other things, that the system is busied against seizure from other entrances before any digit storage can take place.

Reverting now to the operation of relay SA, contacts SA1 to SA4 set up the contact tree which serves to decode the digit stored in the first selection digit store. Since, in the described example, "1" was dialed as the first digit, resulting in the operation of storage relay SA in FIG. 13, battery is connected to conductor S1 which is the topmost horizontal conductor for accessing matrix 40 as viewed in FIG. 11 or 15. More particularly this (resistance) battery is connected to conductor S1 over the following circuit path: battery, resistance R11, FIG. 11*a*, conductor LB, plug-in connector terminal 8, FIG. 13, break contact SD1, SC6 and SB6, make contact SA3, plug-in connector terminal 7, conductor S1.

Figure 14:
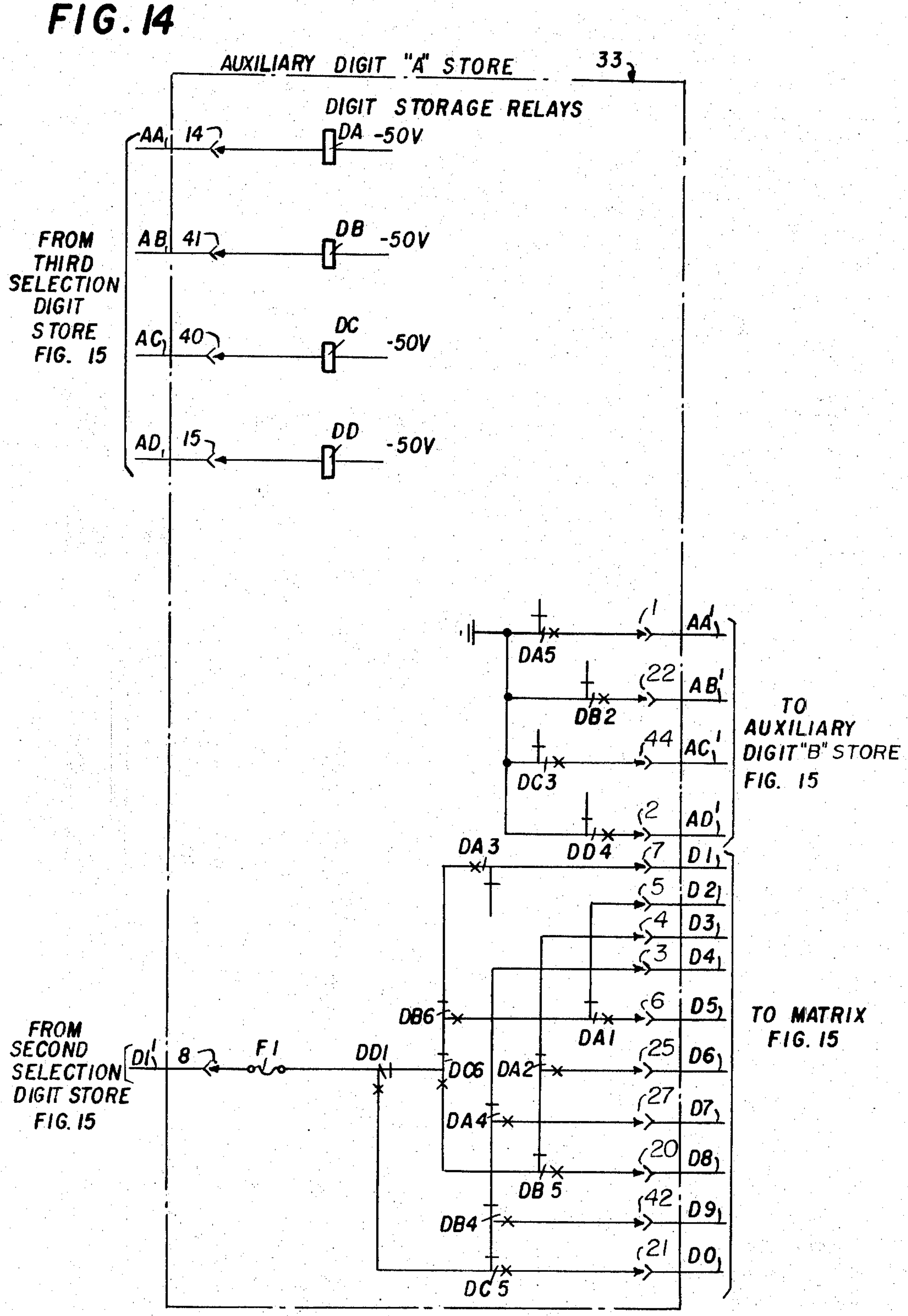
FIG. 14 illustrates the detailed circuitry of the auxiliary digit "A" store, again with particular reference to the system diagram shown in FIG. 10.

At make contact SA5 ground is connected to conductor AA'' to operate a storage relay corresponding to DA, FIG. 14, in the event that an auxiliary digit store is associated with the first selection digit store shown in FIG. 13, to augment its selecting capacity. It will be noted, however, from FIG. 10 that in the present 9 × 29 configuration of the system, no auxiliary digit store is provided in the first selection stage so that conductors AA'', AB'', AC'' and AD'' which serve to pass the stored digital information to an associated auxiliary digit store for storage therein, are not connected in the first selection digit store of the present system.

Finally, contact SA6, FIG. 13, acts to hold relay SA, via the winding of relay DS, to ground projected over the DH conductor by the control relay circuit. Relay DS thus remains short circuited until the digit key is restored, at which time ground is removed from comductor A. Relay DS then operates and holds in series with relay SA in a circuit which may be traced from ground via make contact DG2, FIG. 11, CR9, FIG. 11*a*, conductor DH, winding of relay DS, FIG. 13, make contact SA6, winding of relay SA, conductor BD, make contacts EG1 and EG6 in parallel (FIG. 11*a*), RB, resistor R13, to battery. Relay VA, FIG. 2 restores upon release of the digit key.

Relay DS upon operation, at make contact DS1 extends the incoming B conductor to the corresponding outgoing B' conductor; at make contact DS2 extends conductor C to conductor C'; at make contact DS3 extends conductor D to D'; and at make contact DS4 extends conductor A to A'. In this fashion the incoming "codel" conductors are transferred or switched through to the second selection digit store, FIG. 15. At make contact DS5 of relay DS ground is returned to conductor DS to start timer circuit 20, FIG. 11a, in the control relay circuit. Contact DS6 does not perform any function in the first selection digit store. However it may be mentioned that, in the corresponding printed circuit card for the last selection digit store (FIG. 15) the two conductors LD and LD' are wired to the respective plug-in connector terminals, 10 and 11, in such a way that the circuit for the selected line relay L0, FIG. 12, is completed upon the operation of the DS relay in this last (third) selection digit store. This will be explained in greater detail below.

It was assumed above the "1" was dialed as the first digit. If instead, the first digit keyed by the visitor is "5" "codel" conductor B in addition to conductor A is ground marked, as will be appreciated from the description of FIG. 2 given above. As a result both relays SA and SB will be operated in the first selection digit store, FIG. 13, namely over the following circuit: ground on conductor A, break contact DS4, FIG. 13, winding of relay SA, conductor BD, and in parallel therewith ground on conductor B, break contact DS1, winding of relay SB, conductor BD; and thence through make contacts EG1 and EG6 in parallel (FIG. 11*a*), via RB, R13 to battery. From an inspection of the contact tree shown in the bottom right-hand portion of FIG. 13 it will be noted that in this instance, resistance battery on conductor LB is uniquely connected to conductor S5, namely by way of break contacts SD1 and SC6 and make contacts SB6 and SA1.

Figure 15:
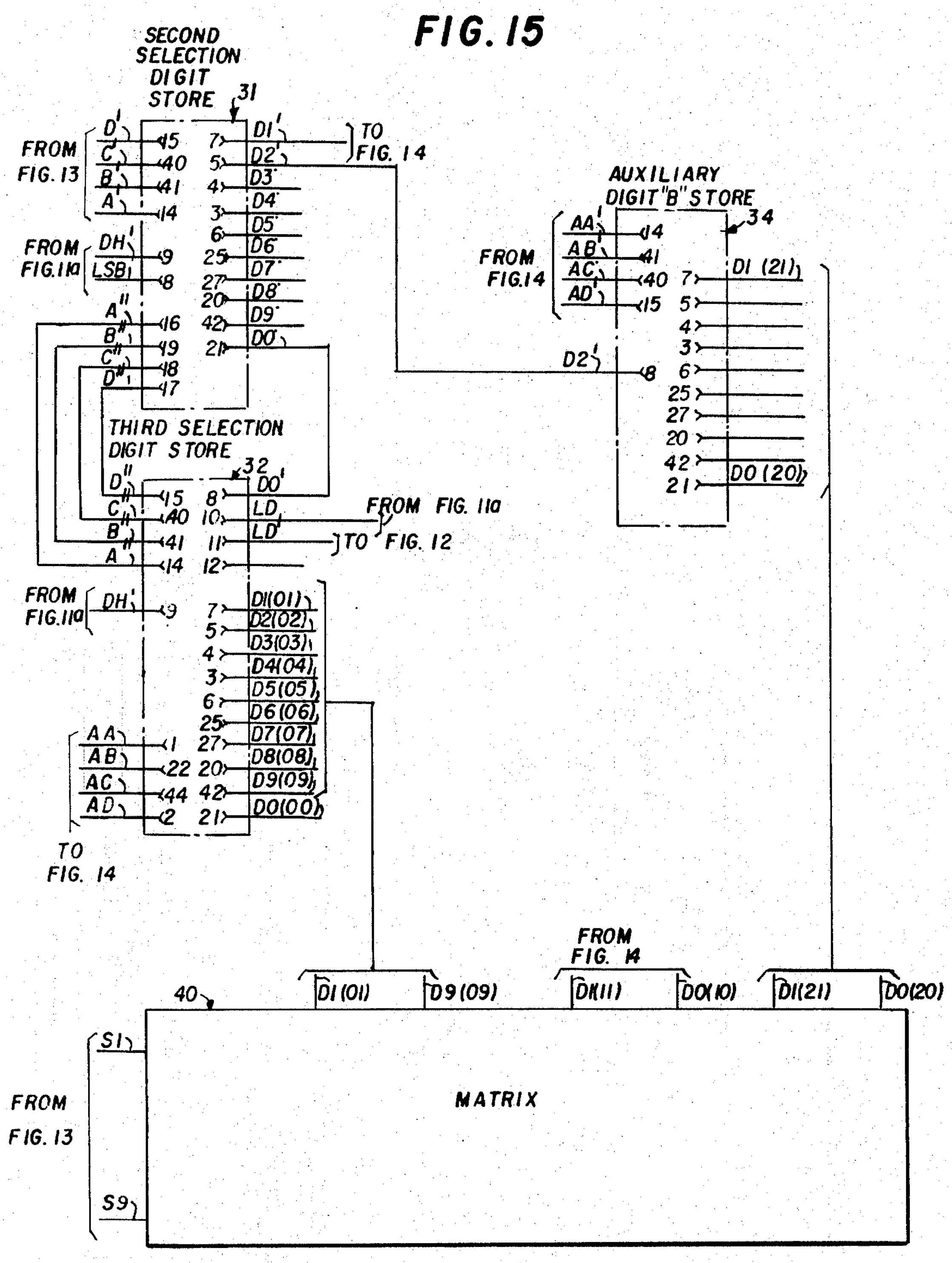
FIG. 15 illustrates the remaining portion of the system of FIG. 10, showing more especially the connector wiring for the remainder of the digit stores, and also showing the line relay matrix of the system in diagrammatic form.
Figure 16:
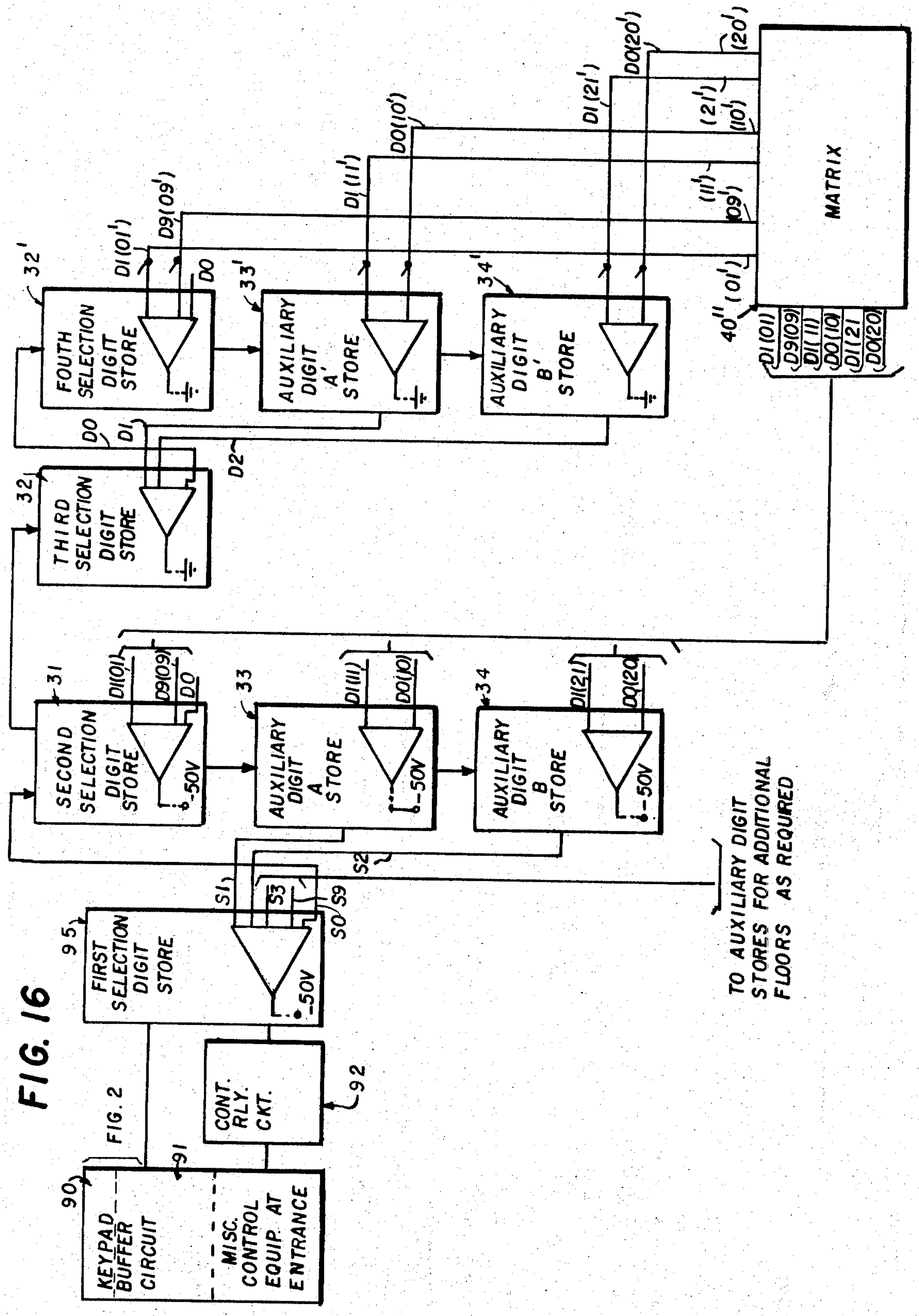
FIG. 16 is a block diagram of a 29 × 29 system following the Translation Numbering Plan.

Attention is now directed to FIG. 15 in which second selection digit store 31, third selection digit store 32 and also auxiliary digit store 34 are indicated by their plug-in connector terminals and in which the various interconnections of the various components of the system, including matrix 40, have been shown in a manner corresponding to the diagrammatic presentation in FIG. 10. It will be recalled that the selection digit stores and the auxiliary digit stores are modular units and that the printed circuit connectors for these cards, such as those shown in FIG. 15, are adapted to interchangeably receive and connect the various selection digit stores and auxiliary digit stores although, of course, the interconnections of the various connectors differ somewhat depending on the configuration — 9 × 29 in the present version — of the system at hand.

Reverting now to the description of this system as diagrammatically shown in FIG. 10, it will be clear from the above explanation that the second digit dialed — again a "1" for example — is received by second selection digit store 31, FIG. 15, and that as a result relay SA of this store is operated, and hence plug-in connector terminal 8 in this store is connected, via break contacts DS1, SC6 and SB6 and make contact SA3 to plug-in connector terminal 7 of this store. As will, moreover, be noted from a comparison between the outside wiring of second selection digit store 31, FIG. 15, and that of first selection digit store 95, FIG. 13, the output conductors of the contact pyramid of store 31 have been designated D1' to D0', in contrast to the designations S1 to S0 used for the contact tree outputs of FIG. 13. Finally it will be noted that while plug-in connector terminal 8 of FIG. 13 is connected, over conductor LB, to battery, the corresponding plug-in connector terminal 8 of second selection digit store 31 is connected over a conductor denoted LSB to ground, namely via break contact RS5, FIG. 11a. Consequently the operation of relay SA in store 31, FIG. 15, results in the connection of ground (rather than battery) to the selected output conductor D1'.

Upon release of the digit key "1" (second digit) the "codel" conductors A', B', C' and D' connected to plug-in connector terminals 14, 41, 40 and 15, respectively, in the second selection digit store 31 are switched through to corresponding outgoing "codel" conductors A'', B'', C'' and D'' which are connected to plug-in terminals 16, 19, 18 and 17, respectively, of store 31. This, in turn, prepares the digit transmission of the third digit to the digit storage relays of third selection digit store 32 via its plug-in connector terminals 14, 41, 40 and 15.

Assuming that the third digit again is "1," then relay SA of store 32 will be operated upon the depression of the corresponding digit key. In this particular instance the selection of the corresponding output terminal 7 of the plug-in connector by means of the relay tree of store 32 does not result in the connection of any potential to the corresponding conductor D1(01) — for the reason that output conductor D1' (rather than D0') had been selected in second selection digit store 31 so that no potential, such as ground, can be received over this D0' conductor at plug-in connector terminal 8 of the third selection digit store.

On the other hand the operation of relay SA in store 32 does give rise to the closure of make contact SA5 in this store and thus to the connection of ground to plug-in connector terminal 1 of this store and thence to conductor AA originating therefrom.

Turning now to FIG. 14 it will be noted that the four conductors AA, AB, AC and AD coming from the third selection digit store, lead to the windings of relays DA, DB, DC, DD of auxiliary digit A store, FIG. 14. Consequently the digit "1" stored in "codel" form in store 32 is now passed to its slave store 33, FIG. 14, that is, in the present example relay DA in the last-mentioned store operates. From a comparison between FIGS. 14 and 13 it will be noted that the circuit of the auxiliary digit stores is quite similar to that of the selection digit stores except that in the case of the auxiliary digit stores, no provision is made for the transfer of the "codel" information to a subsequent stage upon release of the digit key, and thus the DS relay is not needed in these auxiliary digit stores.

The operation of "codel" relay DA, FIG. 14, however leads to the connection of ground to its output conductor D1, in a circuit path including both selection digit store 31, FIG. 15, and auxiliary digit store 33, FIG. 14, in tandem. This circuit path may be traced as follows: ground, break contact RS5, FIG. 11*a*, conductor LSB, plug-in connector terminal 8 of store 31, FIG. 15, terminal 7 of this store, conductor D1′, terminal 8 of store 33, FIG. 14, break contact DD1, DC6, DB6 and make contact DA3, terminal 7, conductor D1. As will be seen from FIG. 15, this results in the ground marking of vertical conductor D1(11) of matrix 40. In view of this marking and the concurrent battery marking of horizontal matrix conductor 51 (as previously described) it will be clear that line relay LS111 (not shown in FIG. 15) is now operated. This relay, of course, corresponds to apartment No. 11 on floor No. 1.

Another result of the operation of relay DA in FIG. 14 is that at the make contact DA5 ground is connected via terminal 1 to conductor AA′ which, as shown in FIG. 15, is connected to terminal 14 of auxiliary digit B store 34. In this manner relay DA of this store 34 is likewise operated — although this has no consequences in the present example since output terminal D1′ (rather than D2′) had been selected in store 31 due to the dialing of 1 as the second digit.

It may briefly be noted that if the second digit had been "0" instead of "1," conductor D1(01), FIG. 15, would have been marked over the following circuit path; ground, break contact RS5, FIG. 11*a*, LSB, terminal 8 of store 31 and hence through its contact pyramid to terminal 21 of this store, D0′, terminal 8 of third selection digit store 32 and hence to the output of this last-mentioned store to its terminal 7 and output conductor D1(01). Similarly if "2" (instead of 1 or 0) had been selected as the second digit the ground on terminal 8 of store 31, FIG. 15, would have been connected through the contact tree of this store to its terminal 5 and hence via conductor D2′ to terminal 8 of auxiliary digit B store 34, and from there through the contact pyramid of this store 34 to its terminal 7 and output conductor D1(21). It will be appreciated, therefore, that the dialing of the second digit "0" leads to the selection of a vertical conductor from group 01 to 09 of matrix 40, FIG. 15; the dialing of digit "1" as the second digit leads to the selection of a conductor in group 11 to 10 of this matrix; and the keying of "2" as the second digit results in the selection of a vertical conductor in matrix group 21 to 20. In this manner then the selection of the desired apartment, 1 to 29, on any floor of the apartment building is accomplished.

Returning now to the operation of the third selection digit store 32, it will be recalled that make contact DS6 in this store connects conductor LD to conductor LD′. As a result upon release of the digit key (third digit) and the consequential operation of relay DS in third selection digit store 32 the following circuit is closed for the operation of common switching equipment start relay L0, FIG. 12: ground, break contacts RS6 and HD1, FIG. 11*a*, break contact RS1, FIG. 11, make contacts EG3 and EA2, break contacts EC5 and EB5, conductor ER′, hookswitch contact 22, FIG. 3, conductor HA′, FIGS. 11 and 12, break contacts J1, JJ1, T01, winding of realy L0, conductor LD′, terminal 11 of digit store 32, FIG. 5, make contact DS6 and terminal 10 in this store, conductor LD, resistance R12, FIG. 11*a*, battery.

The function of relay L0 is to start the common switching equipment substantially in the manner described in the above referenced Matthews patent.

It will be appreciated, of course, that the operating circuit of relay L0 and, for that matter, also the circuit of relay TO referred to hereinbelow differ somewhat from the corresponding circuitry shown in the U.S. patent. In any event the operation of relay L0 causes the desired apartment — in the instant case apartment No. 11 of floor No. 1 — to be signalled. The subsequent operation of the common switching equipment largely corresponds to that described in the patent.

Relay L0 upon operating causes the operation of relay HD in control relay circuit 92, FIG. 11*a*, namely over the following circuit: ground, make contact LO6, FIG. 12, conductor HD′, FIGS. 11 and 11*a*, CR4, winding of relay HD, battery. Relay HD in operating, at contact HD1 transfers the local holding ground from break contact RS6 to ground received from contact LO6 over conductor HD′ and diode CR4; at make contact HD2 it shunts capacitor C3 via resistance R15, thereby to disable timer circuit 20; at make contacts HD3, HD4 and HD5 it disconnects the ground connections to the digit keys of the first, second and third entrances, respectively; and at break contact HD6 it removes operating ground from the apartment line relay, in this particular case relay LS111, leaving this line relay to be held over its own locking circuit (not shown in FIG. 10). The relays in control relay circuit 92, and also the operated digit store relays, are held until the completion of the connection.

At the end of the connection when the resident hangs up, relay TO, FIG. 12, is operated over a circuit other than the one shown in FIGS. 11 and 11*a*. As a result relay LO is released at break contact TO1 and the consequent opening of contact LO6 brings about the release of relay HD. Relay H2 is rendered slow-to-release due to the discharge of capacitor C2 over resistance R9 and through winding of relay HD. During the slow releasing period of relay HD the removal of ground from conductor HD′ causes relays EA and EG to release, followed by the release of all held relays in the selection digit store cards. Relay HD upon releasing as explained, at contact HD1 restores the various circuits to ground at break contact RS6; at HD2 it removes the shunt circuit from capacitor C3 in the timer; and at contacts HD3 to HD6 it restores the entrance circuits and the line relay operating circuit to normal.

Reverting to FIG. 3, the equipment at entrances NO. 2 and 3 is similar to that shown in the upper portion of FIG. 3 except that if the call originates from entrance No. 2, relay EB (rather than relay EA) is operated via conductor ER'', and if the call comes from entrance No. 3 relay EC is operated via conductor ER'''. As will be noted from FIGS. 3 and 12, the operating circuit for relay EB extends over the upper winding of relay J, FIG. 12, and the operating circuit for relay EC extends over the upper winding of relay JJ in that figure. Relays J and JJ serve to indicate, in a manner not particularly shown, the identity of the entrance originating the call to the common switching equipment. Such identification is required to enable the common switching equipment to prepare the proper door release circuit — for door No. 1, No. 2 or NO. 3, as the case may be — so that the respective one of the three entrance doors is opened when the called resident dials the door opening digit, as explained in the Matthews patent.

If a visitor should not key the last digit of the desired apartment number, an automatic release circuit is completed to restore the circuitry of the present arrangement to normal. It will be recalled from the description given above that after the first digit has been keyed relay DS in first selection digit store 95, FIG. 13, is operated upon release of the digit key, and that a make contact DS5 ground is extended to FIG. 11*a*, to start timer circuit 20. If the remaining digits of the desired number are not keyed relay RS, FIG. 11*a*, will operate after a delay of approximately four seconds, in response to a ground pulse received from the timer circuit for a period of about 300 to 500 milliseconds.

Timer circuit 20 includes diodes CR1, CR2 and CR3; capacitors C3, C4, and C5 and resistances R15 to R21, contact HD2 of relay HD, unijunction transistor Q1 and silicon controlled rectifier SCR1. Since timer circuits of this general type are known it will suffice to say that upon receipt of timer start ground over conductor DS, capacitor C3 is charged and that after the charge on this capacitor has reached a predetermined level, silicon controlled rectifier SRF1 is rendered conductive with the aid of unijunction transistor Q1 and others of the aforementioned circuit elements. Rectifier SCR1 upon becoming conductive establishes a low-impedance operating circuit for relay RS which circuit extends from ground on conductor DS via the lower winding of relay RS and rectifier SCR1 to battery. Relay RS in operating, at its break contact RS1 disconnects the common holding ground so that all operated relays are restored to normal; at break contact RS5 ground is removed from the line relay operating circuit; at make contact RS6 ground is connected via conductor RL', FIG. 11, to relay TO, FIG. 12, so that this relay operates with the above described results.

If the visitor makes an error in keying the digits, or if the desired resident does not answer, momentary depression of the hookswitch, at contact 22, FIG. 2, will disconnect the hold circuit of relay EA, as a result of which relay EG releases to remove the holding ground for all other held relays. The operation, of course, is similar if the call originated from entrance No. 2 or No. 3, except that in this case relay EB or EC (rather than relay EA) is involved.

In the case of systems in which speaker microphone panels, instead of handset panels, are provided at the entrances the respective hookswitch contacts are replaced by reset keys of which the one located at entrance No. 1 is shown at 29. The reset key is built in as part of the In-Service lamp at each entrance control panel. The depression of reset key 29 extends ground via make contact K1 and conductor RS' to the upper winding of relay RS, FIG. 11*a*, thereby to manually operate this relay. The consequences of the operation of relay RS have been described above. The K relay (not shown) controlling contact K1, in turn is controlled, in a manner not particularly illustrated, by contacts of relays J, JJ, which identify the entrance originating the call.

It may be added that if speaker microphone panels are used in lieu of handset panels, straps R and S shown in FIGS. 12 and 3, respectively, are provided to tie the corresponding conductors together as illustrated.

Figure 17:
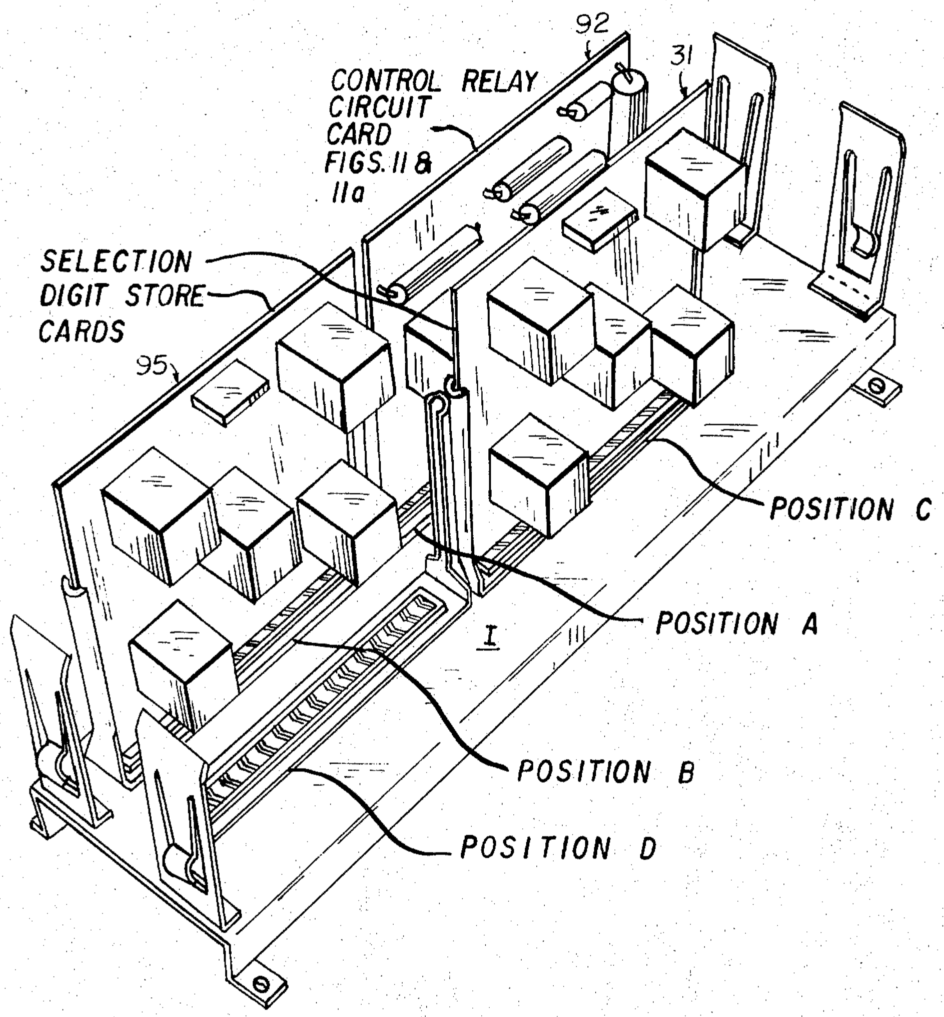
FIG. 17 illustrates the mechanical structure of the switching equipment used in the present arrangement.

Reference is finally made to FIG. 17 which shows the basic assembly unit I as employed for the mounting of the control relay circuit card such as 92, in connector position A, as well as the mounting of up to three selection digit store cards such as 95, 31, 32 in connector positions B, C and D. The five relays of each of the two store cards represented in FIG. 17 can be easily recognized in this figure. Another similar unit II, not shown, may be used — as it would be in the systems of FIGS. 9, 10 and 16 — for accommodating any required auxiliary digit store cards and also any additional selection digit store cards to the extent that these cards are used in the specific system. As mentioned above and as illustrated particularly by FIG. 15, the connectors are arranged so that store cards of both these types can be mounted interchangeably in these connectors, depending on the particular system version employed.

It is to be understood that while the present invention has been shown and described with reference to the preferred embodiments thereof, the invention is not limited to the precise forms set forth, and that various modifications and changes may be made therein without departing from the spirit and scope of the present invention.

What is claimed is:

1. An arrangement for selecting a desired one of a plurality of operable devices by means of a pushbutton dial having a number of contacts, said arrangement comprising:

coding means having inputs connected to said dial contacts and having outputs providing the information received from said contacts in substantially binary coded, parallel form;

at least two sets of digit storage relays, one set for each digit, the relays of each set having windings and normally open and normally closed contacts and the contacts of the relays of each set being connected to form corresponding contact trees;

sequencing means for successively connecting the outputs of said coding means to the relay windings of the individual storage relay sets so that each digit dialed is stored in the respective set;

and said operable devices being connected in a circuit matrix having its first-coordinate conductors connected for access by at least one of said contact trees and having its second-coordinate conductors connected for access by at least one other of said contact trees, whereby the selected one of said devices is operated in a circuit extending over said relay trees in series.

2. In a door intercom system for apartment buildings an arrangement for selecting a desired one of a plurality of switching devices, each operative to signal a corresponding apartment, by means of a pushbutton dial at a building door which dial has *x* columns and *y* rows of pushbuttons and a corresponding first set of contacts and a corresponding second set of contacts such that upon each depression of one of said pushbuttons the respective contact of said first set and the respective contact of said second set are actuated, said arrangement comprising:

a group of $m$ selection conductors;

conversion means interposed between said two sets of contacts and said selection conductors for converting the one-out-of-$x$ plus one-out-of-$y$ selecting information received from said two sets of contacts to a one-or-more-out-of-$m$ code and marking said selection conductors correspondingly;

at least two sets of digit stores, one set for each digit, and each having $m$ selecting inputs and $n$ selecting outputs;

and sequencing means for successively connecting said selection conductors to the inputs of the individual digit stores so that each digit dialled is stored in the respective store;

said switching devices being connected in a circuit matrix having at least $n$ first-coordinate conductors respectively connected to the $n$ outputs of one of said digit stores and having at least $n$ second-coordinate conductors respectively connected to the outputs of at least another of said digit stores.

3. In a door intercom system an arrangement as claimed in claim 2, wherein there is provided a control circuit having switching means common to said digit stores and connected to said digit stores and to said pushbutton dial, said digit stores being conjointly controlled by said pushbutton dial and by said control circuit.

4. In a door intercom system an arrangement as claimed in claim 3, wherein the switching means of said control circuit comprise relays of the miniature type, said switching means being mounted on a plug-in type printed circuit card.

5. In a door intercon system an arrangement as claimed in claim 3, wherein the switching means of said control circuit comprise timing means started upon receipt of the first digit for automatically releasing said control circuit and said digit store or stores if the dialing operation has not been successfully completed upon lapse of a predetermined time after receipt of said first digit.

6. In a door intercom system an arrangement as claimed in claim 3, wherein there are provided, at said door, reset control means for releasing said control cicuit and said digit store or stores, after seizure, at will.

7. In a door intercom system an arrangement as claimed in claim 3, wherein there are provided a plurality of pushbutton dials, one at each of a plurality of doors of said building, and wherein the switching means of said control circuit comprises means effective upon seizure of said control circuit under the control of one of said dials for rendering said control circuit busy for seizure under the control of any other of said dials.

8. In a door intercom system an arrangement as claimed in claim 3, wherein there are provided at said door means for indicating the in-service condition of said arrangement and wherein the switching means of said control circuit comprise means effective upon seizure of said control circuit under the control of said dial, for operating said indicating means.

9. In a door intercom system an arrangement as claimed in claim 3, wherein the switching means in said control circuit comprise means for seizing said control circuit under the control of said pushbutton dial and wherein the circuit path for said seizure means extends from said dial over the one or more of said selection conductors which are energized in response to the dialing of the first digit, and over said first digit store in series.

10. In a door intercom system an arrangement as claimed in claim 9, wherein said seizure means in said control circuit upon operation renders said first digit store effective for the storage of said first digit.

11. In a door intercom system an arrangement as claimed in claim 2, wherein said digit stores include modular selection digit stores and wherein said sequence means include a transfer relay individual to the last-mentioned stores, said transfer relay being effective, upon storage of a digit in the corresponding store, to switch said selection conductors to the selecting input of the next following selection digit store, preparatory to the dialing of the next following digit.

12. In a door intercom system an arrangement as claimed in claim 11, wherein said digit stores also include modular auxiliary digit stores, and wherein each store has means for passing the coded inforamtion stored in said store to the selecting inputs of one of said auxiliary stores, the selecting outputs of said auxiliary store being connected to expand the selecting capacity of the store by which it is controlled.

13. In a door intercom system an arrangement as claimed in claim 12, wherein each said store comprises $m$ digit storage relays having windings respectively connected to said $m$ selecting inputs and having normally open and normally closed contacts, said contacts being connected to form two contact configurations the first of which is in the form of a contact tree and provides said $n$ selecting outputs and the second of which includes normally open contacts of said relays to pass said coded information to the selecting inputs of one of said auxiliary stores.

14. In a door intercom system an arrangement as claimed in claim 13, wherein the relays of said digit store are of the miniature type and are mounted on corresponding plug-in type printed circuit cards.

15. In a door intercom system an arrangement as claimed in claim 14, wherein these are provided printed circuit card connectors designed to alternatively receive, and provide electrical connections for, one of said selection digit store cards or one of said auxiliary digit store cards.

16. In a door intercom system an arrangement as claimed in claim 2, wherein the first-coordinate conductors of said circuit matrix are connected to respectively correspond to the floors of said building while the second-coordinate conductors of said matrix are connected to respectively correspond to the apartments within the floors.

17. In a door intercom system an arrangement as claimed in claim 2, wherein the first-coordinate conductors of said circuit matrix respectively correspond to the first digit, or the first and second digits, of designation codes assigned to said apartments irrespective of their floor association, while the second-coordinate conductors of said matrix are connected to respectively correspond to the last digit of said designation codes.

18. In a door intercom system for apartment buildings an arrangement for selecting a desired one of a plurality of switching devices, each operative to signal a corresponding apartment, by means of a pushbutton dial at a building door which dial has $x$ columns and $y$ rows of pushbuttons and a corresponding first set of contacts and a corresponding second set of contacts such that upon each depression of one of said pushbuttons the respective contact of said first set and the respective contact of said second set are actuated, said arrangement comprising:

a group of $m$ selection conductors;

conversion means interposed between said two sets of contacts and said selection conductors for converting the one-out-of-$x$ plus one-out-of-$y$ selecting code received from said two sets of contacts to a binary selecting code different from said first-mentioned selecting code and marking said selection conductors correspondingly;

at least two sets of digit stores, one set for each digit, and each having $m$ selecting inputs and $n$ selecting outputs;

and sequencing means for successively connecting said selection conductors to the inputs of the individual digit stores so that each digit dialled is stored in the respective store;

said switching devices being connected in a circuit matrix having at least $n$ first-coordinate conductors respectively connected to the $n$ ouputs of one of said digit stores and having at least $n$ second-coordinate conductors respectively connected to the outputs of at least another of said digit stores.

* * * * *